United States Patent [19]

Fu et al.

[11] Patent Number: 5,101,478

[45] Date of Patent: Mar. 31, 1992

[54] I/O STRUCTURE FOR INFORMATION PROCESSING SYSTEM

[75] Inventors: Andrew N. Fu, Lexington; Tom R. Kibler, Groton; James B. MacDonald, Lowell; Robert C. Nash, Chelmsford; Stephen W. Olson, Wilmington; Bhikoo J. Patel; Robert R. Trottier, both of Lowell; Kevin T. Mahoney, Tewksbury; David L. Whipple, Braintree; Peter A. Morrison, Framinghamm, all of Mass.

[73] Assignee: Wang Laboratories, Inc., Lowell, Mass.

[21] Appl. No.: 228,768

[22] Filed: Aug. 4, 1988

Related U.S. Application Data

[63] Continuation of Ser. No. 750,112, Jun. 28, 1985, abandoned.

[51] Int. Cl.$^5$ .............................................. G06F 13/00
[52] U.S. Cl. .................................. 395/275; 395/200; 364/DIG. 1; 364/240.1; 364/240.2; 364/240.5; 364/229.2; 364/260.1; 364/260.2; 364/284.2
[58] Field of Search ........................... 364/200, 900

[56] References Cited

U.S. PATENT DOCUMENTS

| | | |
|---|---|---|
| 3,710,324 | 1/1973 | Cohen . |
| 4,214,305 | 7/1980 | Tokita et al. .................. 364/200 |
| 4,320,452 | 3/1982 | Kempf ............................ 364/200 |
| 4,323,967 | 4/1982 | Peters et al. .................. 364/200 |
| 4,348,725 | 9/1982 | Farrell et al. ................. 364/300 |
| 4,363,094 | 12/1982 | Kaul et al. .................... 364/200 |
| 4,371,932 | 2/1983 | Dinwiddie, Jr. ............... 364/200 |
| 4,388,686 | 6/1983 | Haid ............................... 364/200 |
| 4,396,995 | 8/1983 | Grau ............................... 364/900 |
| 4,414,620 | 11/1983 | Tsuchimoto ..................... 364/200 |
| 4,418,386 | 11/1983 | Vrielink ......................... 364/200 |
| 4,428,043 | 1/1984 | Catiller et al. ................ 364/200 |
| 4,480,307 | 10/1984 | Budde et al. .................. 364/200 |
| 4,484,275 | 11/1984 | Katzman et al. ............... 364/200 |
| 4,486,826 | 12/1984 | Wolff et al. .................. 364/200 |
| 4,493,021 | 1/1985 | Agrawal et al. ............... 364/200 |
| 4,494,185 | 1/1985 | Gunderson et al. ............. 364/200 |
| 4,504,927 | 3/1985 | Callen ............................ 364/900 |
| 4,536,838 | 8/1985 | Ringel et al. .................. 364/200 |
| 4,543,627 | 9/1985 | Schwab ........................... 364/200 |
| 4,586,128 | 4/1986 | Dewoskin ........................ 364/200 |
| 4,608,631 | 8/1986 | Stiffler et al. ................ 364/200 |
| 4,620,275 | 10/1986 | Wallach et al. ................ 364/200 |
| 4,623,886 | 11/1986 | Livingston ..................... 370/85 |
| 4,635,192 | 1/1987 | Ceccon et al. ................. 364/200 |

FOREIGN PATENT DOCUMENTS 0060535 9/1982 European Pat. Off. .
0141742 11/1984 European Pat. Off. .

Primary Examiner—Gareth D. Shaw
Assistant Examiner—Matthew C. Fagan
Attorney, Agent, or Firm—Michael H. Shanahan; Scott K. Peterson

[57] ABSTRACT

An I/O structure for use in a digital data processing system of the type in which system components including a processor and a system memory are connected by a system bus. The I/O structure includes a system bus interface connected to the system bus, a synchronous satellite processing unit (SPU) bus connected to the system bus interface, one or more satellite processing units (SPUs) connected to the SPU bus, and peripheral devices attached to the satellite processing units. Each SPU has three main components: control logic including a microprocessor for controlling the SPU, a device adapter specific to the peripheral device for controlling the peripheral device and transferring data between the peripheral device and the SPU, and an interface unit connected to the control logic and the device adapter for providing I/O communications to the SPU bus and responding to I/O communications on the SPU bus. The I/O communications fall into two classes: communications to SPUs and communications to system components. The communications to SPUs all require a single SPU bus cycle; the communications to system components require one or more cycles. The system bus interface translates communications to system components into communications on the system bus and translates communications on the system bus intended for a SPU into communications to SPUs. The SPU bus includes first lines for carrying an I/O command and an identifier for an SPU involved in the communication and second lines for carrying the contents of the communication. In multicycle communications, the I/O command and identifier remain on the first lines for all cycles, but the information on the second lines varies from cycle to cycle.

24 Claims, 16 Drawing Sheets

TRIPLE CYCLE OPERATION

| I/O DATA BUS | | CONTROL LINES | | |
|---|---|---|---|---|
| ADDRESS | | WRT 64 | S | HOLD |
| DATA | | WRT 64 | S | HOLD |
| DATA | | WRT 64 | S | |

DOUBLE CYCLE OPERATION

| I/O DATA BUS | CONTROL LINES | | |
|---|---|---|---|
| ADDRESS | WRT 32/8 | S | HOLD |
| DATA | WRT 32/8 | S | |

*FIG. 3A*

| DATA BUS | CONTROL BUS | | |
|---|---|---|---|
| | | | AR |
| ADDRESS | WRT 64 | S | HOLD |
| DATA | WRT 64 | S | HOLD |
| DATA | WRT 64 | S | AR |
| ADDRESS | WRT 64 | S | HOLD |
| DATA | WRT 64 | S | HOLD |
| DATA | WRT 64 | S | AR |
| ADDRESS | WRT 64 | S | HOLD |
| DATA | WRT 64 | S | HOLD |
| DATA | WRT 64 | S | AR |
| ADDRESS | WRT 64 | S | HOLD |
| DATA | WRT 64 | S | HOLD |
| DATA | WRT 64 | S | AR |

*FIG. 3B*

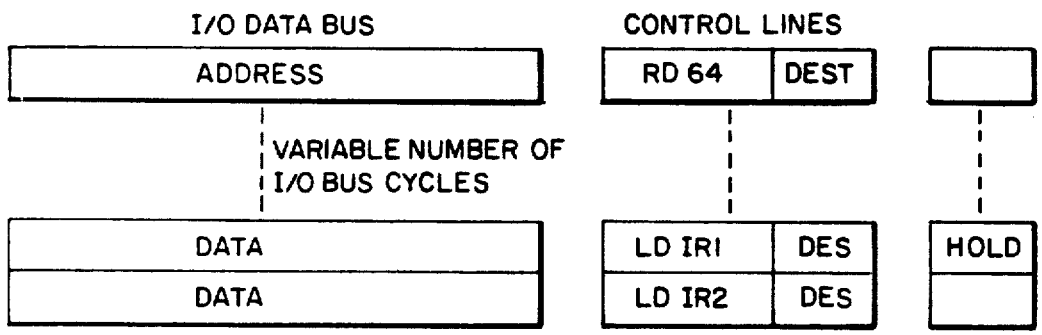
SINGLE WORD READ REQUEST (DOUBLE CYCLE OPERATION)
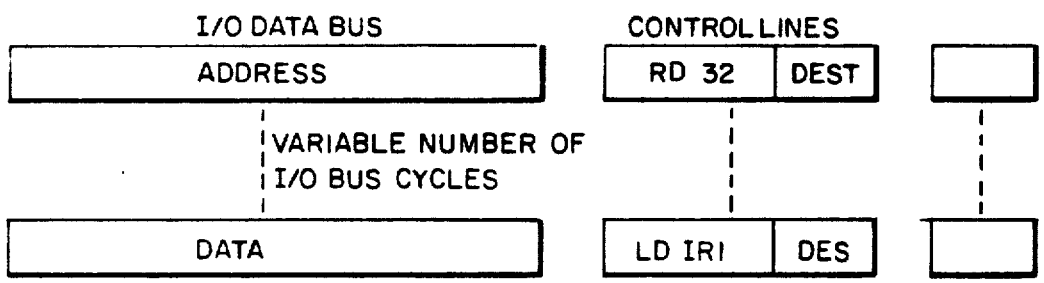
FIG. 3C
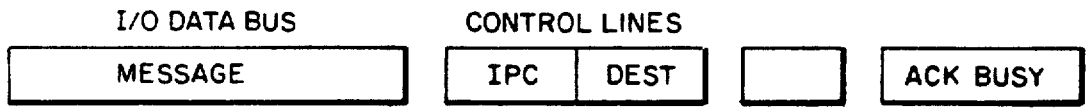
FIG. 3D

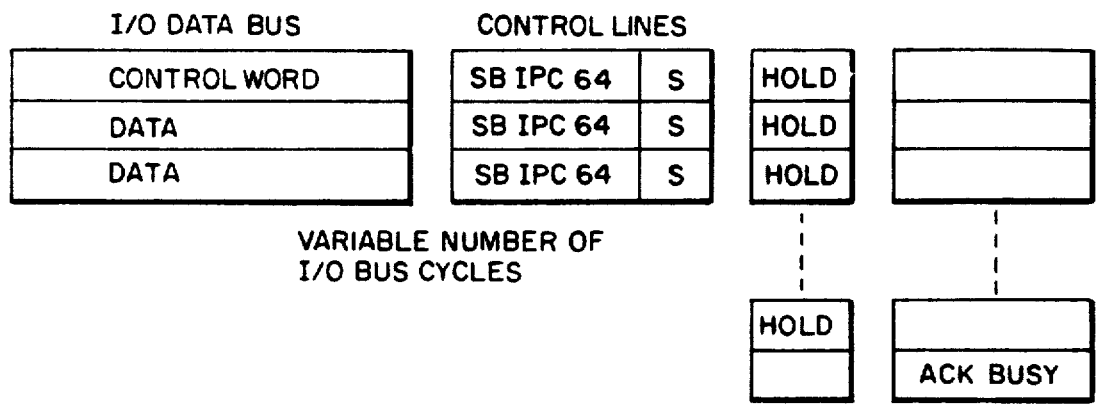
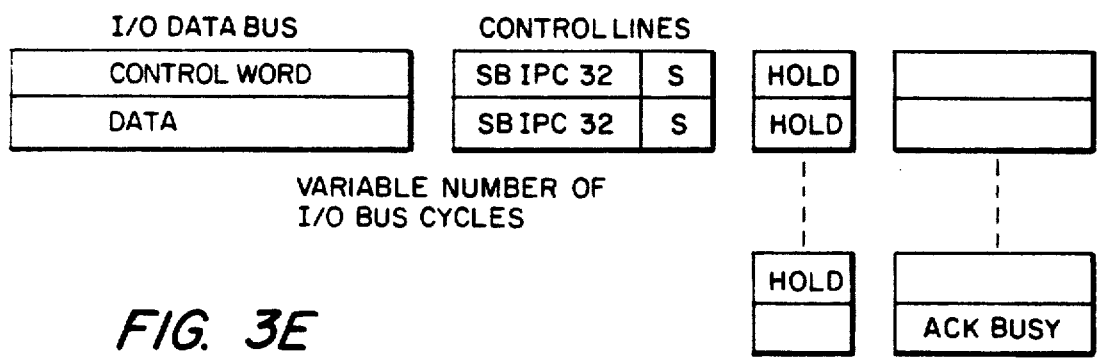
FIG. 3E
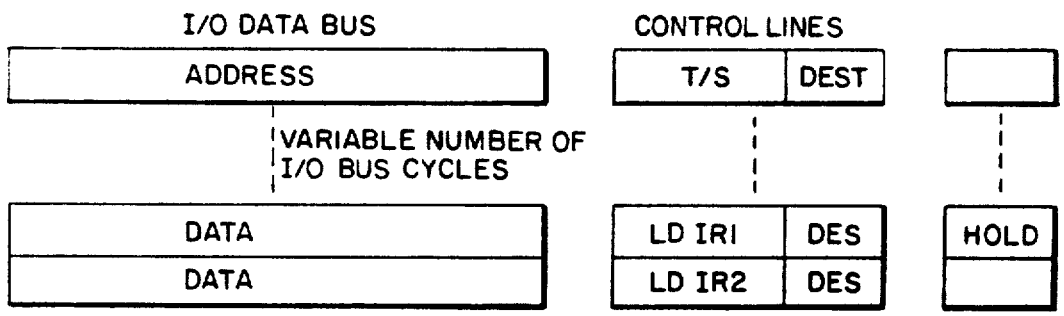
FIG. 3F
FIG. 3G
FIG. 3H

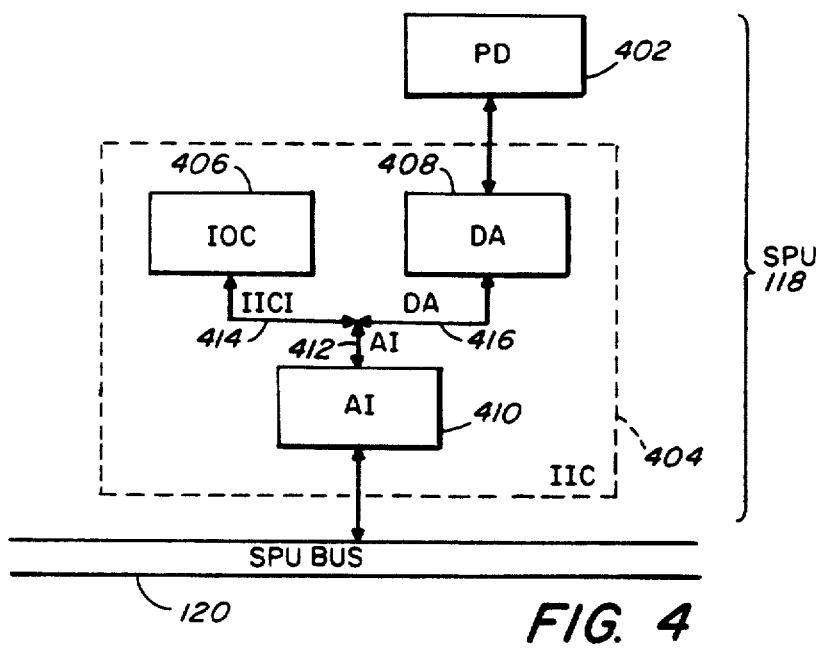

FIG. 4

BUS CONTROL REGISTER

|  | I/O BUS CMD 8 7 6 5 4 | I/O ADDRESS 3 2 1 0 | PORT |
|---|---|---|---|
| READ 32 BITS -- | 0 0 1 0 0 | SOURCE I/O ADDRESS | OUT(50) |
| READ 64 BITS -- | 0 0 1 1 0 | SOURCE I/O ADDRESS | OUT(50) |

SYSTEM MEMORY ADDRESS (OR1)

```
MSB                                                          LSB
15    12 11                     00 15                         00
┌─────┬──────────────────────────────────────────────────────┐
│ RVD │      28 BIT PHYSICAL SYSTEM MEMORY ADDRESS            │
└─────┴──────────────────────────────────────────────────────┘
 |        OR1H OUT (58)          |       OR1L OUT (56)       |
 00                            15 16                         31
```

RVD – RESERVED

SYSTEM MEMORY DATA

```
MSB                                                          LSB
  00                          31 00                          31
      ┌──────────┬──────────┬──────────┬──────────┐
      │   IR1H   │   IR1L   │   IR2H   │   IR2L   │
READ 64│15     00 │15     00 │15     00 │15     00 │
      ├──────────┼──────────┼──────────┼──────────┤
      │   IR1H   │   IR1L   │   IR2H   │   IR2L   │
READ 32│15     00 │15     00 │----NOT USED--------│
      └──────────┴──────────┴──────────┴──────────┘
         IN(10)     IN(12)     IN(14)     IN(16)
```

FIG. 6A

BUS CONTROL REGISTER

| | I/O BUS CMD<br>8  7  6  5  4 | I/O ADDRESS<br>3  2  1  0 | PORT |
|---|---|---|---|
| WRITE 8 -- | 0  1  0  1  0 | SOURCE I/O ADDR | OUT(50) |
| WRITE 32 -- | 0  0  0  1  0 | SOURCE I/O ADDR | OUT(50) |
| WRITE 64 -- | 0  0  0  0  0 | SOURCE I/O ADDR | OUT(50) |

SYSTEM MEMORY ADDRESS (OR1)

MSB  15  12,11                              00,15                              00  LSB

| RVD | 28 BIT PHYSICAL SYSTEM MEMORY ADDRESS |
|---|---|
| 00  OR1H OUT(58)  15 | 16  OR1L OUT(56)  31 |

RVD - RESERVED

SYSTEM MEMORY DATA

MSB                                                                           LSB 0  15,0  15,0  15,0  15

| OR2H<br>OUT(00) | OR2L<br>OUT(02) | OR3H<br>OUT(04) | OR3L<br>OUT(06) |
|---|---|---|---|
| 0    15 | 16    31 | 0    15 | 16    31 |

|  | 0  15,0  7,8  15,0  15,0  15 |
|---|---|
| W64 | DATA |
| W32 | DATA \| NOT USED |
| W8 | NOT USED \| DATA \| NOT USED |

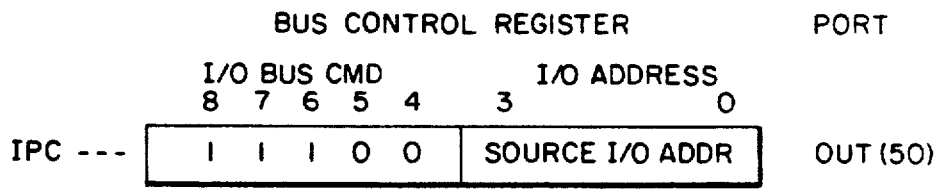
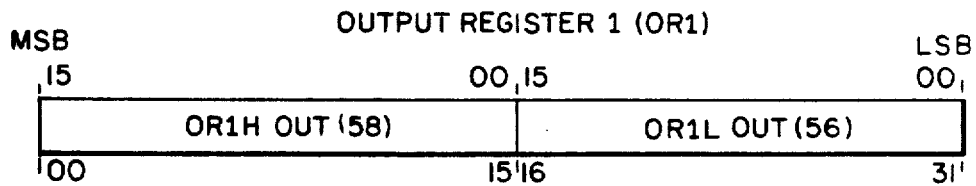
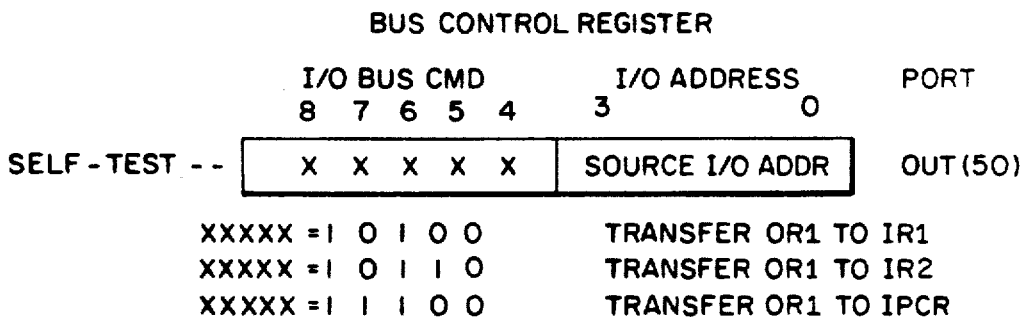
FIG. 6C
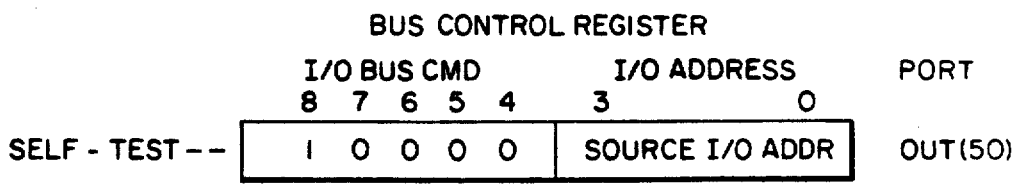
FIG. 6D

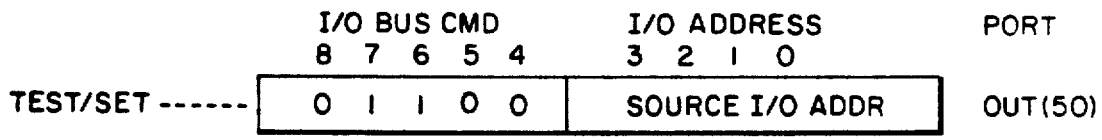
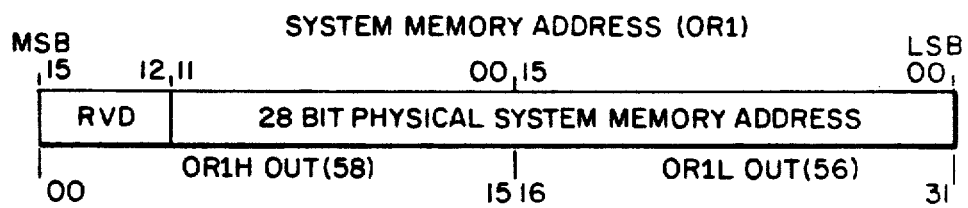
*FIG. 6E*
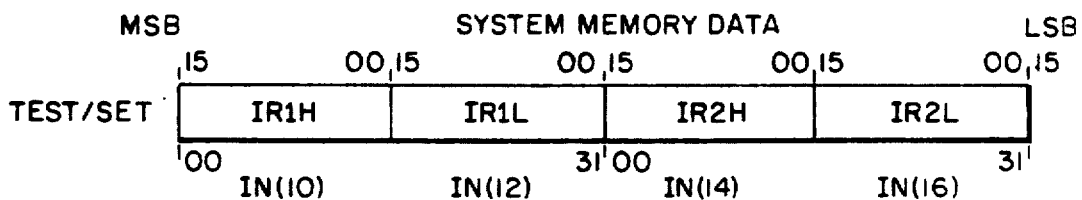
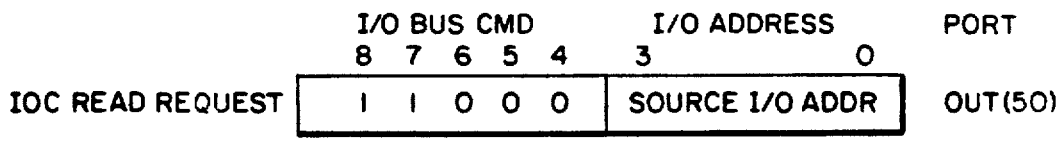
*FIG. 6F*

| BSR BITS | 4 ACK | 3 BUSY | |
|---|---|---|---|
| | 0 | 0 | NO RESPONSE, EITHER SOURCE OR DEST. SBI ABSENT |
| | 0 | 1 | ILLEGAL CASE |
| | 1 | 0 | SB IPC COMMAND ACCEPTED |
| | 1 | 1 | SB IPC COMMAND REJECTED, REISSUE SB IPC |

SYSTEM BUS CONTROL (OR1)

| RVD | SB DES. ADDR. | SB CMD | DES. I/O ADDR | SPARE |
|---|---|---|---|---|
| 15..8 | 7..4 | 3..0 | 15..12 | 11..0 |
| | OR1H OUT(58) | | OR1L OUT(56) | |
| 0..7 | 8..11 | 12..15 | 16..19 | 20..31 |

RVD = RESERVED

SYSTEM BUS DATA OR2/OR3

| OR2H OUT(00) | OR2L OUT(02) | OR3H OUT(04) | OR3L OUT(06) |
|---|---|---|---|
| 0..15 | 0..15 | 0..15 | 0..15 |
| 0..15 | 16..31 | 0..15 | 16..31 |

*FIG. 6G*

| BSR BITS | 4 ACK | 3 BUSY | |
|---|---|---|---|
| | 0 | 0 | NO RESPONSE, EITHER SOURCE OR DEST. SBI ABSENT |
| | 0 | 1 | ILLEGAL CASE |
| | 1 | 0 | SB IPC COMMAND ACCEPTED |
| | 1 | 1 | SB IPC COMMAND REJECTED, REISSUE SB IPC |
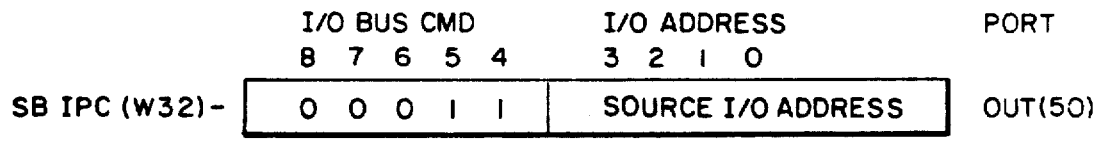
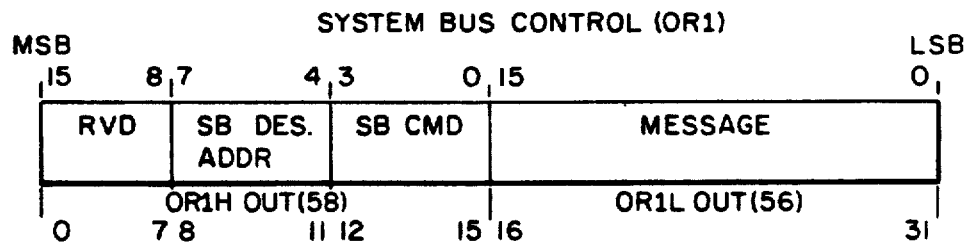
FOR SB IPC COMMAND TYPE (A) THE FORMAT OF OR1 IS:
*FIG. 6H*

FOR SB IPC COMMAND TYPES (B), (C) AND (D) THE FORMAT OF OR1 IS:
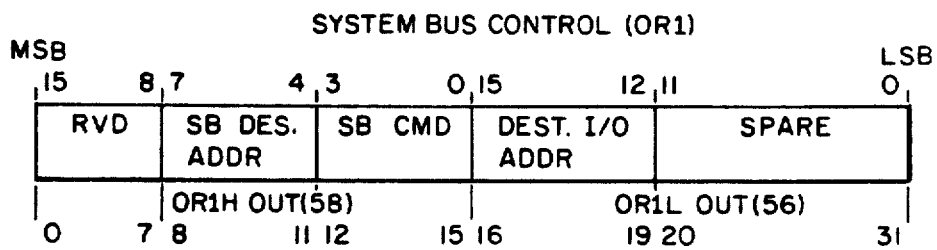
RVD = RESERVED
FOR ALL TYPES OF SB IPC COMMANDS (A), (B), (C) AND (D) THE FORMAT OF OR2 IS:
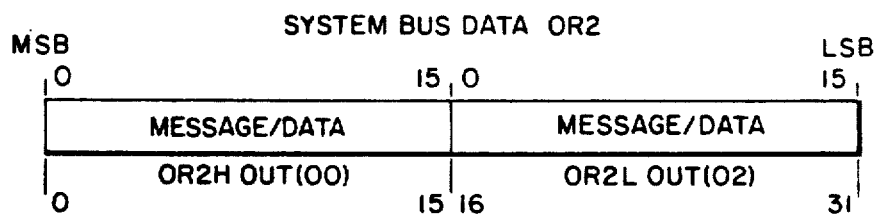
SOURCE I/O's BCR
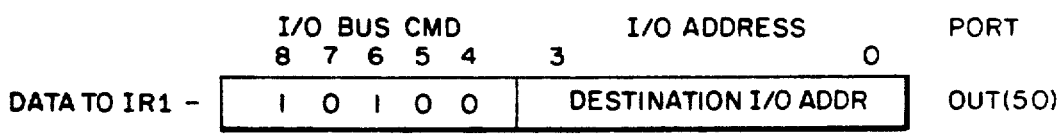
DESTINATION I/O's BCR
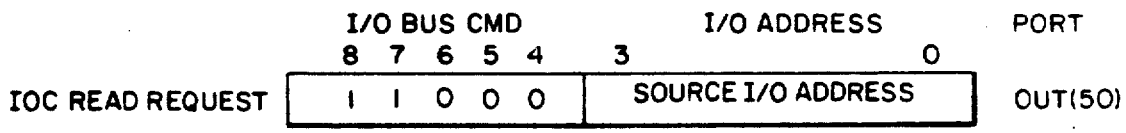
FIG. 6H (CONTINUED-1)

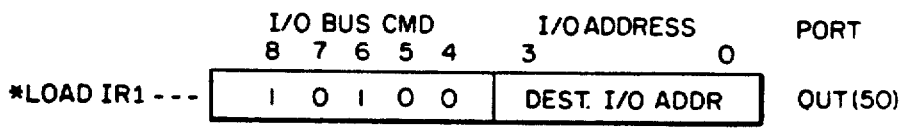
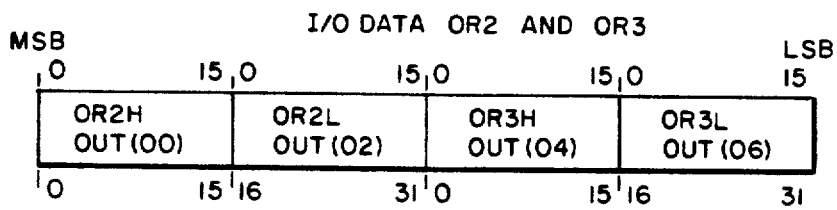
*NOTE: THE I/O ARBITRATION LOGIC AUTOMATICALLY GENERATES THE I/O BUS COMMAND LOAD IR2 DURING THE I/O BUS TRANSFER OF OR3.
*FIG. 6H* (CONTINUED-2)
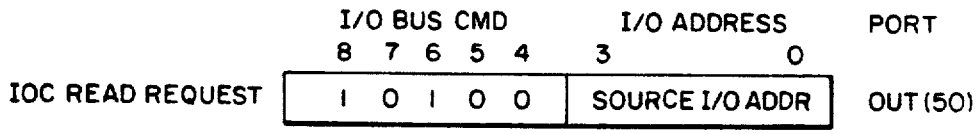
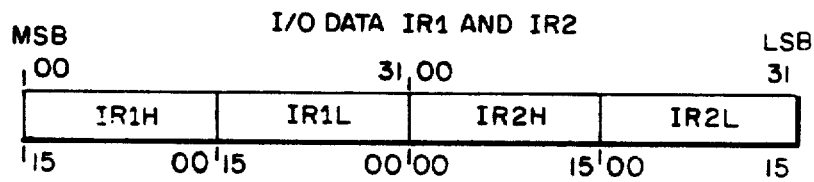
*FIG. 6J*

SYSTEM MEMORY ADDRESS (OR1)

RVD = RESERVED

FOR SINGLE/DOUBLE WORD DMA TO SYSTEM MEMORY

BUS CONTROL REGISTER

| | I/O BUS CMD<br>8 7 6 5 4 | I/O ADDRESS<br>3 2 1 0 |
|---|---|---|
| WRITE 32 -- | 0 0 0 1 0 | SOURCE I/O ADDRESS |
| WRITE 64 -- | 0 0 0 0 0 | SOURCE I/O ADDRESS |

BUS CONTROL REGISTER

| | I/O BUS CMD<br>8 7 6 5 4 | I/O ADDRESS<br>3 2 1 0 |
|---|---|---|
| READ 32 BITS -- | 0 0 1 0 0 | SOURCE I/O ADDRESS |
| READ 64 BITS -- | 0 0 1 1 0 | SOURCE I/O ADDRESS |

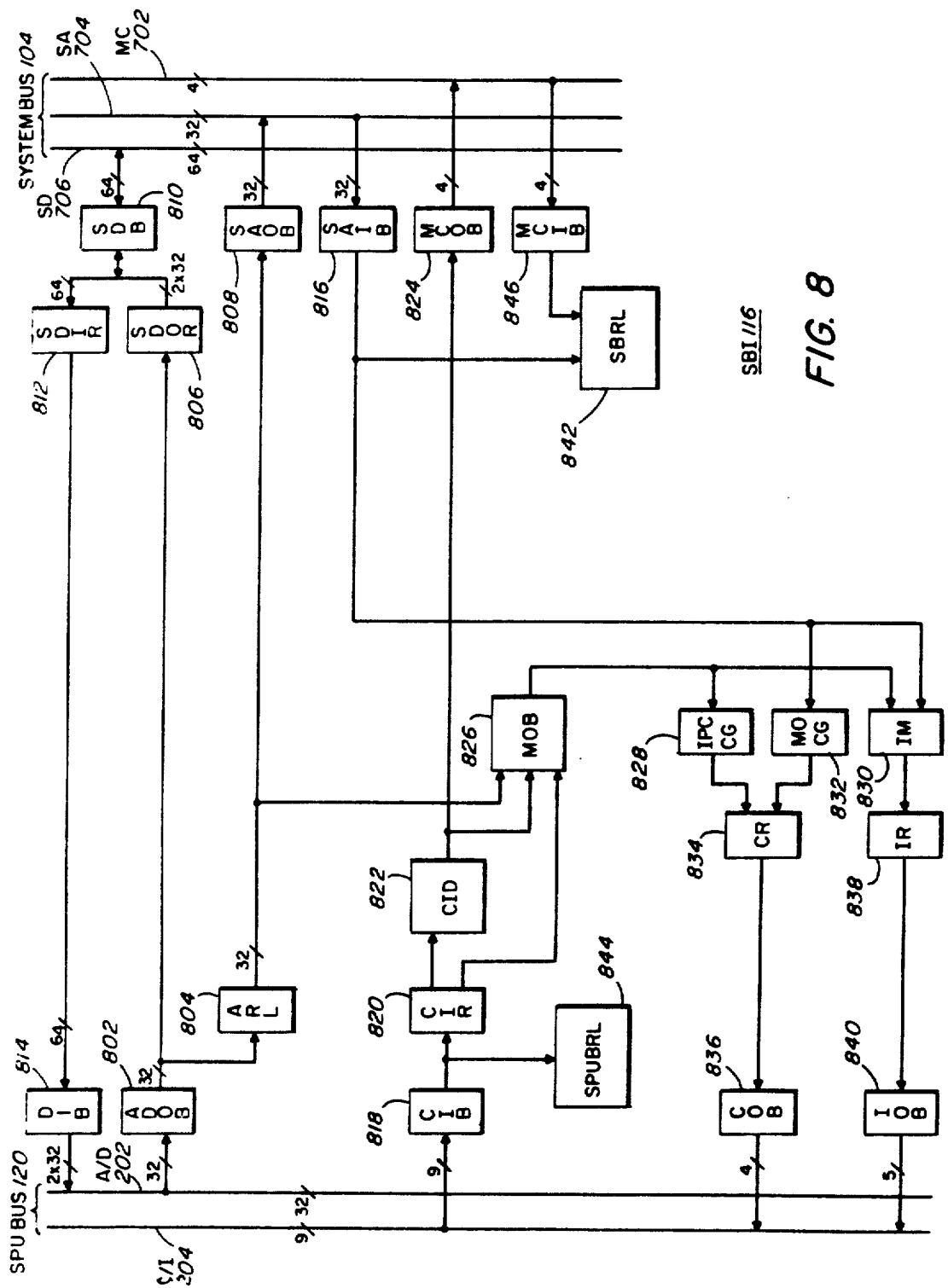

I/O STRUCTURE FOR INFORMATION PROCESSING SYSTEM

This is a continuation of co-pending application Ser. No. 750,112 filed on June 28, 1985, now abandoned.

BACKGROUND OF THE INVENTION

1. Field of the Invention

The present invention relates to information processing systems and, more specifically, to an input/output structure for an information processing system.

2. Discussion of the Prior Art

The two major tasks which must be performed by an information processing systems are the processing of information and the moving of information into and out of the system and most systems are structurally and operationally organized to reflect these operations. That is, such a system is comprised of internal information processing elements, such as CPUs and memories, and an internal system bus for communication between the internal elements, and an input/output (I/O) structure. The I/O structure normally includes an I/O bus connected from the internal system bus and a plurality of peripheral devices. Examples of peripheral devices include input/output devices such as disc drives, displays, printers, telecommunications links, tape streamers and user terminals. The peripheral devices may further include independent or associated processing units, such as other general purpose computers or specialized processing devices, such as scanners and specialized arithmetic or signal processors.

A recurring limitation on the performance of any information processing system is set by the capability of the I/O system. That is, how efficiently may the I/O system move information into the system to be processed, and processed information out of the system. A further, related problem is the amount of system resources and processing time which must be devoted to directing and controlling I/O operations. In addition, many systems are limited in their growth capability by the capacity of the system and I/O structure to add further peripheral devices and the needs of the system expand.

It is an object of the present invention to provide an improved I/O structure for an information processing system.

It is a further object of the present invention to provide an improved I/O structure allowing communication of data and messages among peripheral devices connected from the same I/O bus, among peripheral devices connected from different I/O busses, and between peripheral devices and the internal processing elements of the system.

It is a yet further object of the present invention to provide an improved intelligent interface controller for connecting peripheral devices to an I/O bus.

SUMMARY OF THE INVENTION

In accordance with the present invention, an information processing system includes internal processing means, internal system bus means for communication among the internal processing elements, and peripheral means for conducting information into and out of the system. Input/output (I/O) means are connected from the internal bus means and to the peripheral means for conducting information among the peripheral elements and the internal elements. The I/O means includes a control bus means for conducting control words among the peripheral means connected from the I/O means, each control word including a target identification field containing information identifying a peripheral means connected from the I/O means and a command field containing information identifying an type of I/O operation to be executed. The I/O means further includes an address/data bus means for conducting address/data words among the peripheral means connected from the I/O means. Each communication of an address/data word is accompanied by the communication of a corresponding control word.

The execution of an I/O operation involves the transmitting at least one address/data word, each address/data word including information to be transferred, the information including data or a message or address information identifying a destination in the address space of the internal processing means of the information to be transferred. With each address/data word, there is transmitted a control word, each control word including a target identification field containing information identifying a peripheral means connected from the I/O means and a command field containing information identifying a type of I/O operation to be executed.

The transfer of data between peripheral means connected from the same I/O means comprises the steps of transmitting at least one address/data word, each address/data word containing data to be communicated, and an accompanying control word for each data word. Each control word includes a target identification field containing an identification of a peripheral means connected from the I/O means, and a command field containing information specifying a data transfer with a peripheral means connected from the I/O means.

The transfer of a message between peripheral means connected from the same I/O means comprises the transmitting a single address/data word containing the message to be communicated. The accompanying control word includes a target identification field containing an identification of a peripheral means connected from the I/O means.

The transfer of data between a peripheral means connected from the I/O means and an internal processing means connected from the internal bus means, or another peripheral device connected from another I/O means, includes the transmitting at least two address/data words, including a first address/data word containing address information identifying the destination of the data in the address space of the internal processing means, and at least one following address/data word containing the data to be transferred. Each accompanying control word includes a target identification field containing information identifying the system bus interface means and a command field containing information specifying a data transfer between a peripheral means connected from the I/O means and an internal processing means connected from the internal bus means.

In a further aspect, the present invention relates to an interface controller means connected between the I/O bus means and the peripheral device means for controlling the execution of I/O operations. The interface controller means includes an interface means connected from the I/O bus means for conducting address/data words between the interface controller means and the I/O bus means, a device adapter means connected from the interface means for conducting data between the peripheral device and the interface means, and a controller means for generating control words and addresses and responsive to control words for providing signals for controlling operation of the device adapter and interface means.

The interface means includes a first register means having an output connected to the address/data bus means for receiving data from the device adapter means, receiving initial address information from the controller means and generating successive addresses therefrom, and receiving messages from the controller means, and providing the contents thereof to the address/data bus means as a address/data word of an operation. A second register means has an input connected from the address/data bus means for receiving address/data words and providing data to the device adapter means and messages to the controller means.

The controller means includes a status register means for receiving and storing information regarding the state of operation of the I/O bus means. The status register means further includes a bus transfer register means for storing information regarding the status of an I/O operation initiated by the controller means, the bus transfer means being settable by the controller means to a first state indicating that an operation is to be initiated and to a second state by the interface means to indicate that the operation has been ended. The interface means is in turn responsive to the first state of the bus transfer register means to initiate the operation and the controller means is responsive to the second state to be free to initiate a further operation.

The controller means further includes a bus control register means having an output connected to the control word bus means and responsive to operation of the controller means for storing and providing control words to the control word bus means.

Other objects, advantages and features of the present invention will be understood by those of ordinary skill in the art after referring to the following detailed description of the preferred embodiment and drawings, wherein:

BRIEF DESCRIPTION OF THE DRAWINGS

FIGS. 3A, 3B, 3C, 3D, 3E, 3F, 3G, and 3H illustrate the execution of certain basic I/O communication operations;

FIG. 4 is a block diagram representation of an IIC 404;

FIGS. 6A, 6B, 6C, 6D, 6E, 6F, 6G, 6H, 6J, and 6K are illustrative representations of the control and data information structures utilized in certain I/O operations;

DESCRIPTION OF A PREFERRED EMBODIMENT

Figure 1:
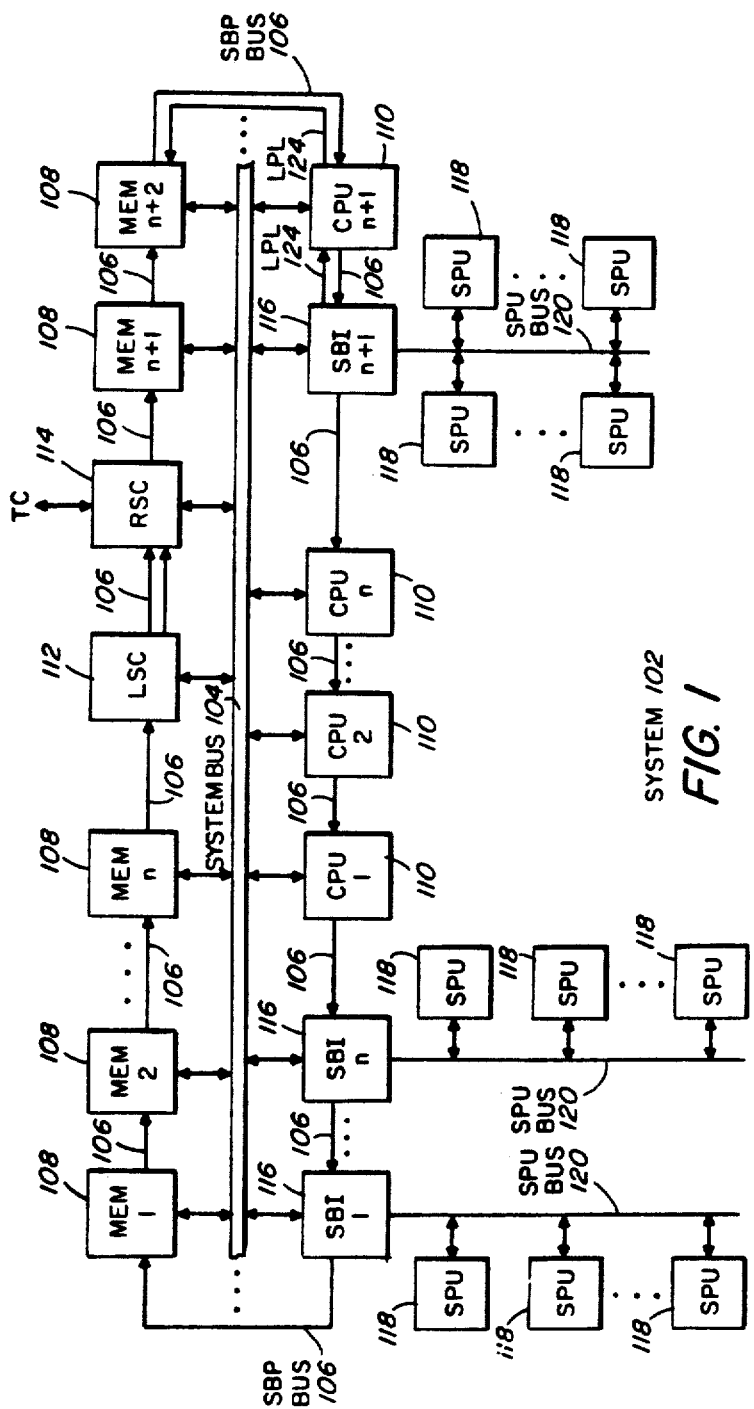
FIG. 1 is a block diagram of an exemplary system incorporating the present invention.

The following description will first present the overall structure and operation of a system incorporating a presently preferred embodiment of the present invention, followed by a description of the structure and operation of the Input/Output (I/O) structure of the present invention.

It should be noted that reference numbers appearing in the drawings and in the following descriptions are comprised of three digits. The two least significant (rightmost) digits identify a particular element appearing in a particular drawing and the most significant (leftmost) digit identifies the figure in which that element first appears. For example, element 124 is the 24th element appearing in FIG. 1 and first appears in FIG. 1. A reference numbers is assigned the first time the reference element appears in the descriptions and is used to refer to that element throughout the following descriptions and drawings.

A. Elements of System 102 and General Operation (FIG. 1)

Referring to FIG. 1, therein is presented a block diagram of an exemplary System 102 incorporating the I/O structure of the present invention. As shown therein, System 102 includes a plurality of internal elements, that is, elements directly involved in the execution of programs, and a system bus structure for communication between the internal elements of the system. System 102 further includes a plurality of peripheral elements, that is, elements providing input/output and support functions, and an I/O structure for communication between the peripheral and internal elements of the system.

Referring first to the system bus and the System 102 internal elements connected therefrom, the primary elements of the system bus structure that are visible at this level are System Bus 104 and System Bus Priority (SBP) Bus 106. System Bus 104 is the means by which the internal elements of System 102 communicate with one another while SBP Bus 106 is the link through which the internal elements connected from System Bus 104 determine access to System Bus 104.

Considering the System 102 internal elements connected directly to System Bus 104, each such element includes sufficient internal intelligence, for example, in the form of microcode control, to perform at least specialized functions independently of the other elements of System 102. Examples of such elements, as illustrated in FIG. 1, include Memory Units (MEMs) (1 to n+2) 108, Central Processing Units (CPUs) (1 to n+1) 110, Local System Controllers (LSC) 112, Remote System Controllers (RSC) 114, and System Bus Interfaces (SBIs) (1 to n+1) 116.

The design of and functions performed by elements such as MEMs 108 and CPUs 110 are well known in the art and require no further description. LSC 112 and RSC 114 may, for example, be small computers of the personal or professional class adapted to perform certain system control functions, such as providing a user control interface, that is, a "soft control panel". In this respect, RSC 114 may differ from LSC 112 in being connected to a remote user/controller, for example, for diagnostic purposes, through a Telecommunication Link (TC).

The I/O structure of System 102 is, as shown in FIG. 1, comprised of one or more I/O bus structures. Each I/O bus structure includes a Satellite Processor Unit (SPU) Bus 120 connected from System Bus 104 through a System Bus Interface Unit (SBI), with one or more Satellite Processor Units (SPUs) 118, that is, peripheral elements, connected from each SPU Bus 120.

As will be described in detail below, each SPU 118 is comprised of a peripheral device and an Intelligent Interface Controller (IIC) connecting the peripheral device to the SPU Bus 120. The peripheral devices include devices or system elements which, for example, due to data rates or functions, do not require direct access to System Bus 104 to perform their function. Examples of peripheral devices include input/output devices such as disc drives, displays, printers, telecommunications links, tape streamers and user terminals. The peripheral devices may further include independent or associated processing units, such as other general purpose computers or specialized processing devices, such as scanners and specialized arithmetic or signal processors. Again, each peripheral device may include sufficient internal intelligence, for example, in the form of microcode control, to perform at least specialized functions independently of the other elements of System 102.

Having described the overall structure and operation of System 102, the following will describe the System 102's I/O structure through a description of the structure and operation of an SPU Bus 120 and SPU 118s and the I/O communications operations performed by these elements. System 102's internal bus structure, that is, System Bus 104 and SBP Bus 106, will then be described to provide an example of a setting in which the I/O structure may operate. Finally, the interface between the I/O structure and System 102's internal bus structure will be described.

Figure 2:
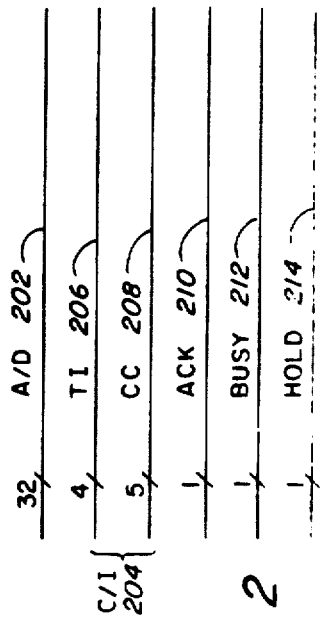
FIG. 2 is a diagrammic representation of SPU Bus 120.

B. System 102 I/O Structure, General Description (FIGS. 2 and 3)

As previously described, the function of the I/O structure of the present invention is to enhance both the performance of I/O operations and, indirectly, the overall performance of System 102. In this regard, and as described below, the I/O structure allows multiple SPU Busses 120 and associated SPUs 118 to be easily interfaced to System 102, thereby allowing the I/O capability of System 102 to be expanded without requiring significant modifications to the system. Further, the present I/O structure transfers the control and execution of many I/O operations from System 102's internal elements, for example, CPUs 106, to the I/O structure, thereby reducing the non/program execution operations required of CPUs 106. In this regard, and as described below, the I/O structure, and in particular the SPUs 118, provide a means for queueing system CPU operations, that is, I/O operations initiated by System 102's CPUs 110; this facility, in turn, provides support for multi-tasking system operation. Finally, the present I/O structure provides both data and message/command communications between peripheral devices and System 102 internal elements, such as MEMs 108 and CPUs 110, between peripheral devices connected from the same SPU Bus 120, and between peripheral devices connected from different SPU Busses 120, thereby enhancing both the flexibility and power of I/O related communications operations. Together, these features provide System 102 with significant pre-processing capability at the peripheral interface level and accordingly significantly augments System 102 performance.

As described above, the I/O structure of System 102 is comprised of one or more I/O bus structures. Each I/O bus structure includes a Satellite Processor Unit (SPU) Bus 120 connected from System Bus 104 through a System Bus Interface Unit (SBI), with one or more Satellite Processor Units (SPUs) 118 connected from each SPU Bus 120. The following description of the present I/O structure will first describe the general structure of an SPU Bus 120 and the general data/message/command I/O operations executed therethrough by the associated SPUs 118. The structure and operations of the SPUs 118 will then be described, followed by a description of the SPU Bus 120/System Bus 104 interface provided through the associated SBI 118.

B. 1. General Description of SPU Bus 120 (FIG. 2)

Referring to FIG. 2, therein is represented the structure of SPU Bus 120. As shown therein, SPU Bus 120 includes a 32 bit bi-directional, multiplexed Address-/Data (A/D) Bus 202 and a 9 bit bidirectional Command/Identification (C/I) Bus 204. As described further below, and as indicated in FIG. 3, C/I Bus 204 is comprised of a 4 bit bidirectional Target Identification (TI) Bus 206 and a 5 bit bidirectional Command Code (CC) Bus 208. SPU Bus 120 further includes a single bit bidirectional Acknowledge (ACK) Line 210, a single bit bidirectional Busy Line 212 and a single bit bidirectional Hold Line 214. Other elements of SPU Bus 120 will be described as necessary in the following detailed descriptions of the I/O structure.

As will be described in the following descriptions of certain I/O communication operations, an I/O communication operation is comprised of a sequence of one or more 32 bit A/D words transmitted through A/D Bus 202, with each A/D word being accompanied by a 9 bit C/I word transmitted through C/I Bus 204. The A/D words of the sequence contain the substance of the communication and, depending upon the communication, each A/D word of the sequence may comprise a message, data or a memory address. The C/I word accompanying each A/D word contains information identifying the intended recipient of the communications and the type of communication to be performed.

A C/I word is comprised of a 4 bit TI Field appearing on TI Bus 206 and a 5 bit CC Word appearing on CC Bus 208. The TI Field contains the information identifying the intended recipient of the communication while the CC Field contains the information identifying the type of communication being performed. It is therefore apparent that a C/I Word may specify up to 32 possible communication operations, and may identify up to 16 possible recipients of a communication.

It should be noted that the contents of a TI Field operate as a local address with respect to the transmitting SPU 118, that is, the TI Field identifies a recipient residing on the same SPU Bus 120 as the sending SPU 118. A single SPU Bus 120 may therefore have up to 15 uniquely identifiable SPUs 118 connected therefrom, the SPU 120 Bus's SBI 116 being identified by the TI Field in the same manner as an SPU 118.

As will be described in the following, recipients not residing on the same SPU Bus 120 as the sending SPU 118 are addressed indirectly and through the sending SPU 118's SBI 116. That is, the TI and CC fields of the C/I Word transmitted by the sending SPU 118 respectively identify the SPU 118's local SBI 116 as the recipient of the communication and that the communication operation is to, for example, an SPU 118 located on another SPU Bus 120 or a System 102 internal element, such as a MEM 108. The address information contained in the accompanying A/D Word is then used to identify and locate the intended recipient of the communication.

As will also be described in the following, the Acknowledge (ACK), BUSY and HOLD signals transmitted through, respectively, ACK Line 210, Busy Line 212 and Hold Line 214 are used to control and coordinate communications operations. In brief, ACK and BUSY are transmitted to the sender of a communication request by the intended recipient in response to a request for a communication operation. ACK and BUSY indicate, respectively, that the intended recipient has received the request and that the intended recipient is busy or not busy, that is, may or may not execute the operation. HOLD may be asserted by the sender when necessary in certain operations to extend the sender's control of the busses being used in the operation.

Having described the basic structure and operation of SPU Bus 120, and of the communications operations executed therethrough, certain communications operations will be briefly described next below, and will be described in further detail in other following descriptions of the operation of the I/O structure.

B. 2. Basic I/O Communications Operations (FIGS. 3A to 3H)

FIGS. 3A to 3H illustrate the execution of certain basic I/O communication operations, in particular and respectively (A) a write from an SPU 118 to a MEM 108, (B) successive writes from an SPU 118 to a MEM 108, (C) a read from a MEM 108 to a SPU 118, (D) a communication between two SPU 118s connected from the same SPU Bus 120, (E) a communication between SPU 118s connected from different SPU Busses 120, (F) a test operation, (G) a handshake between two SPU 118s executing a block transfer, and (H) an I/O initialization operation.

In each of these figures, the information or signals appearing on each of A/D Bus 202, TI Bus 206 and CC Bus 208 of C/I Bus 204, ACK Line 210, Bus Line 212 and Hold Line 214 are shown for the successive bus cycles of the illustrated operation, with time increasing from top to bottom in the manner indicated.

With respect to FIG. 3A, a write from an SPU 118 to a MEM 108 requires either two or three bus cycles, with memory address information being transferred in the first cycle and one or two data words of 32 bits each being transferred in the following one to two cycles. It should be noted that in FIG. 3A and following figures, WRT 64 is a command for a 64 bit (two word) transfer while WRT 32/8 is a command for a 32 bit (single word) or 8 bit (one byte) transfer. The designation S in the TI field represents the identification of the communication source, that is, the sending SPU 118.

With respect to FIG. 3B, in successive writes from an SPU 118 to an MEM 108 the I/O structure permits some overlapping of memory write operations. That is, while on SPU 118 is engaged in a write operation, a second SPU 118 is allowed to execute its arbitration cycle through which it obtains access to the SPU Bus 120 during the last cycle of the first SPU 118s write operation. It should be noted that in FIG. 3B and following figures, the designation AR represents an SPU 118's bus arbitration cycle.

With respect to FIG. 3C, a read from a MEM 108 to a SPU 118 results in the transfer of either one or two 32 bit words from the MEM 108 to the SPU 118 and includes two separate bus arbitration operations. First, the SPU 118 arbitrates for access to its SPU Bus 120 and issues a read command accompanied by a MEM 108 address in a first bus cycle. Next, after the SBI 116 receives the read command and address, the SBI 116 performs an System Bus 104 data transfer operation, as described in a following section of the present description, to obtain the data from the MEM 108. The delay between the initial request and when the SBI 116 obtains the data depends upon the traffic on System Bus 104, as previously described. The SBI 118 then arbitrates for access to the SPU Bus 120 and issues a command to transfer the data to the SPU 118, the number of cycles required for the transfer depending upon the data read. It should be noted in FIG. 3C that RD 64 is a command requesting the reading of a double word (64 bits) from a MEM 108 while RD 32 is a command to read a single word. The references LD IR1 and LD IR2 designate a transfer of data from the SBI 116 to the SPU 118 and will be described further in a following description of an SPU 118. The designation DES in a TI Field refers to a destination address, that is, the identification of the SPU 118 receiving and read data.

It should be noted that, as described in the following, reads from a MEM 108 may be overlapped. That is, further MEM 108 reads or writes may be executed in the waiting period between the addressing of a MEM 108 and the return of the addressed data.

With respect to FIG. 3D an Interprocessor Communication (IPC) between two SPU 118s connected from the same SPU Bus 120 transfers 32 bits of data or message and requires one SPU 120 Bus cycle. The control signals ACK and BUSY are used in this operation to indicate to the source of the message whether the message/data was accepted or rejected by the destination SPU 118.

With respect to FIG. 3E, a communication between SPU 118s connected from different SPU Busses 120 is conducted through System Bus 104 and the SPU 118's respective SBI 116s and are referred to as System Bus Interprocessor Communication (SB IPC) operations. An SB IPC operation transfers 64 bits in a cycle and requires either two or three bus cycles to complete. Control signals ACK and BUSY are again used in SB IPC operations and either the target SBI 116 or the source's SBI 116 may reject the communication. The SB IPC operation further utilizes an Interprocessor Communication Ready (IPCRDY) control signal, which is generated by the target SPU 118 and sampled by the target SBI 116 to determine whether the target SPU 118 may receive the communication. It should be further noted that the TI Field of the C/I Word contains the identification of the source SPU 118, rather than that of the target SPU 118; the address of the target SPU 118, as described more fully in a following description, resides in a C/I Word stored by the source SPU 118. Again, the delay required in completing the operation depends upon System Bus 104 traffic.

With respect to FIG. 3F, a test and set operation is a test reading of a double word from a MEM 106 and is similar to a read of a double word from an MEM 106, previously described. In this operation, the SPU 118 issues an MEM 106 address and receives two data word from the MEM 108. The SBI 116 receives the two words, transmits the unmodified data to the SPU 118, sets the most significant bit of the double word, and writes the double word back into the same location in the MEM 106. The SBI 116 retains control of System Bus 104 during this operation to maintain data ingegrity. The designation T/S appearing in FIG. 3F refers to a test and set operation command.

With respect to FIG. 3G, and I/O Control Read Request command (IOC RD) is used as a handshake operation during the execution of a block data transfer between two SPU 118s. A block transfer is comprised of two or more single word (32 bit) transfer of data and the SPU 118 receiving the block transfer issues this command after receiving each word to request the transfer of the next data word from the source SPU 118. No data is transferred during this operation, and the source SPU 118 is required only to decode the command to initiate the transfer of the next word.

Finally, with respect to FIG. 3H, an I/O initialization (SEL INIT) operation is used by the System 102 internal devices to reset selected SPU 118s. This command is issued by an SBI 116 when the SBI 116 detects a relevant "Reset Target SPU" command on the system internal bus, as previously described, and no SPU 118 may reset another SPU 118. This operation utilizes yet another control signal, referred to as Select Initialize (SELINIT). SELINIT is generated by an SBI 116 when an SPU 118 reset is commanded, and is sampled by the SPU 118s connected from that SBI 116's SPU Bus 120; the selected SPU 118 is reset upon the occurrence of both an SELINIT and the SPU 118's identification in the C/I Word TI Field.

Having described the structure and operation of SPU Bus 120 and certain I/O communications operations, the structure and operation of SPUs 118 will be described next below.

Figure 5:
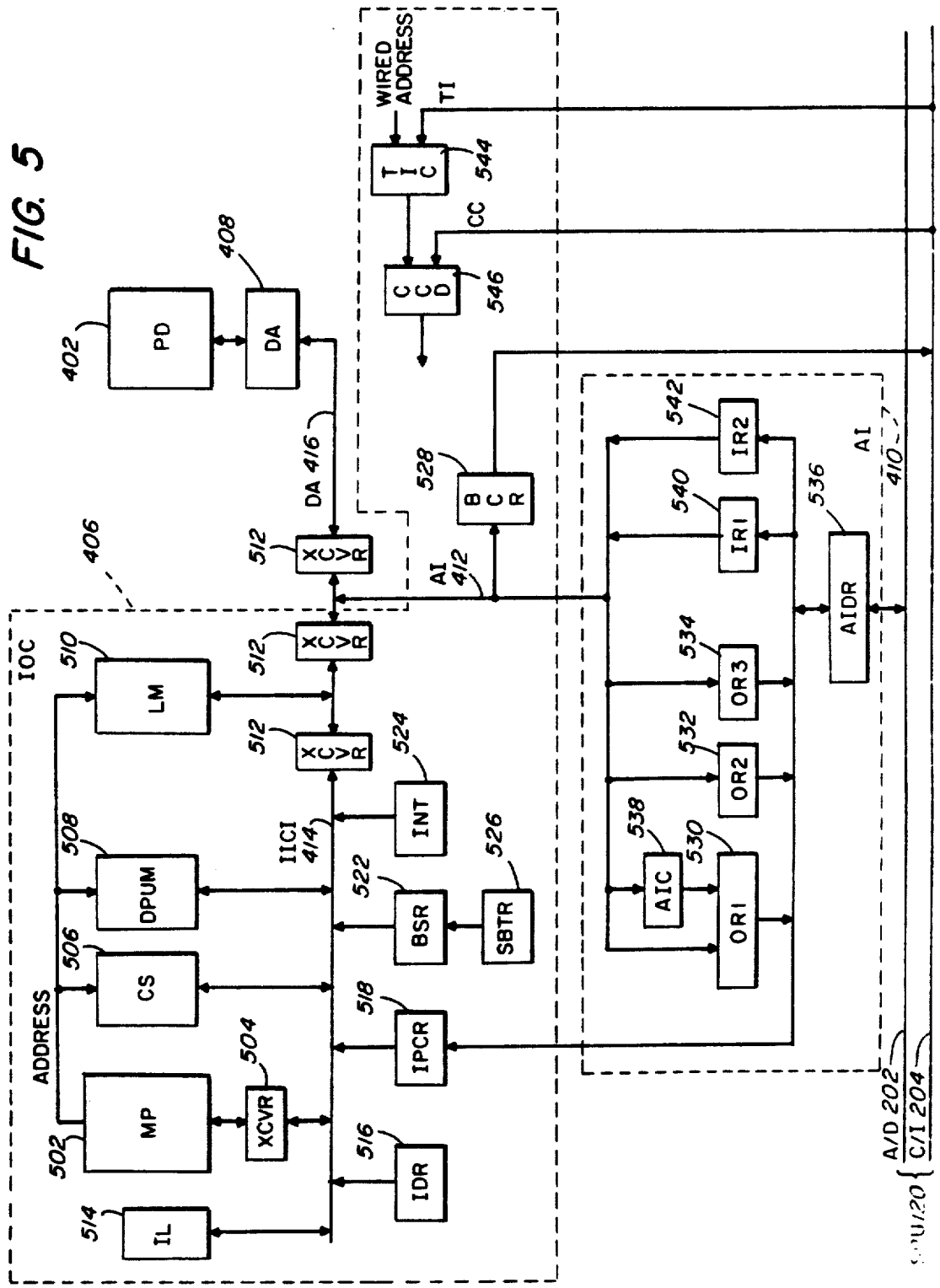
FIG. 5 is a block diagram of IOC 406 and AI 410.

C.3. SPU 118 (FIGS. 4 and 5)

As previously described, each SPU 118 is comprised of a peripheral device and an Intelligent Interface Controller (IIC) connecting the peripheral device to the SPU Bus 120. The peripheral devices include devices or system elements which, for example, due to data rates or functions, do not require direct access to System Bus 104 to perform their functions. Examples of peripheral devices include input/output devices such as disc drives, displays, printers, telecommunications links, tape streamers and user terminals. The peripheral devices may further include independent or associated processing units, such as other general purpose computers or specialized processing devices, such as scanners and specialized arithmetic or signal processors. Again, each peripheral device may include sufficient internal intelligence, for example, in the form of microcode control, to perform at least specialized functions independently of the other elements of System 102.

As also previously described, the IIC 404 portions of SPUs 118 are intended to provide System 102 with preprocessing capability at the peripheral interface level by transferring the control and execution of certain I/O and communications operations to SPUs 118. In addition, the IICs provide queueing of operations; the capability of operation queueing in turn may support a multi-task capability for System 102. Yet further, and as will be described below, the structure of the IICs is modular and flexible to provide maximum commonality of IIC structure among different peripheral devices.

C.3.a. Overall Structure of An SPU 118 (FIG. 4)

Referring to FIG. 4, therein is presented an overall block diagram of an exemplary SPU 118. As shown therein, an SPU 118 is comprised of a Peripheral Device (PD) 402 and an Intelligent Interface Controller (IIC) 404. As described above and described in further detail below, IIC 404 provides a coupling and interface between the PD 402 and SPU Bus 118 and directs and executes the I/O communications operations pertaining to it's associated PD 402.

As shown in FIG. 4, IIC 404 is in turn comprised of an Intelligent I/O Operation Controller (IOC) 406, a Device Adapter (DA) 408 and Arbitration/Interface Logic (AI) 410. As will be described further below, IOC 404 provides the functionality to control and direct the I/O communications operations of the SPU 118, while DA 408 and AI 410 provide control and communication interfaces to, respectively, the PD 402 and SPU Bus 120.

As shown in FIG. 4, AI 410 is bidirectionally connected to SPU Bus 120 while DA 408 is bidirectionally connected to the PD 402. AI 410 is further provided with a bidirection path to IOC 406 and DA 408 through AI Bus 412, with IOC 406 and DA 408 being bidirectionally connected to AI Bus 412 through, respectively, IIC Internal (IICI) Bus 414 and DA Bus 416. IOC 406 and DA 408 thereby share the control/communication interface to SPU Bus 120 provided by AI 410 and AI Bus 412.

In the presently preferred embodiment of IIC 404, both IOC 406 and AI 410 are common among many, and preferably most, IICs 404. Because of the differing interface and operational requirements of the various PDs 402, however, the DAs 408 will differ among the IICs 404 and the design and operation of a particular DA 408 will depend upon the particular PD 402 connected therefrom. In this respect, it should be noted, as described below, that the functions performed by IOC 406 include certain control operations with respect to the associated PD 402. Because of this, and as will be described below, at least portions of the operations performed by an IOC 406 are determined by programs loaded into an IOC 406 memory from System 102. In addition, in the presently preferred embodiment of IICs 404, certain IICs 404 will not, due to the particular design of the associated PDs 402, include an IOC 406. In these embodiments, the PD 402 will include the functionality to provide the control functions otherwise performed by the IOCs 406.

Having described the overall structure and operation of an SPU 118, the structure and operation of an IIC 404 will be described next below.

C.3.b. Structure and Operation of an IIC 404 (FIG. 5)

Referring to FIG. 5, therein is presented a block diagram of a presently preferred embodiment of an IIC 404. In FIG. 5, the IOC 406 and AI 410 portions of the IIC 404 are shown in detail, while the DA 408 portion is shown as a generalized block due to the variation in detailed design of the DAs 408; it should be noted that DAs 408 will be described separately in a following portion of the present description. It should further be noted that, for clarity of presentation, certain elements of IOC 406 and AI 410 which are common and well known to those of ordinary skill in the art, such as clock driver circuits and memory address/control/refresh circuits, are not shown herein.

In the following, both the IOC 406 and AI 410 portions of the IIC 404 will first be described at a general level, followed by further detailed descriptions of each of these elements.

C.3.b.1. General Description of IOC 406 (FIG. 5)

As described above, IOC 406 essentially provides the control functionality to control the operation of the IIC 404. As shown in FIG. 5, IOC 406 includes a Microprocessor (MP) 502, which provides detailed control of the operations of the IIC 404; MP 502 may be, for example, an Intel 8086-2. As shown in FIG. 5, MP 502 is provided with clock and read control inputs and provides control outputs, including certain bus signals such as ACKNOWLEDGE and READY, to other portions of the IIC 404. As also shown in FIG. 5, a data input/output of MP 502 is bidirectionally connected to a bidirectional 16 bit IIC Internal (IIC) Bus 414 through Transceiver (XCVR) 504.

Associated with MP 502 is Control Store (CS) 506, which is a dynamic random access memory (DRAM) whose primary function is as a control store to store programs directing the operations of the IIC 404, and MP 502 in particular. As shown in FIG. 5, DRAM is provided with address inputs from MP 502 and has data inputs/outputs bidirectionally connected from IICI Bus 414.

Diagnostic/Power-Up Memory (DPUM) 508 is provided to contain power-up diagnostic and initial program load routines for IOC 406 and, for example, provides the control routines for loading the IOC 406 controlling programs into CS 506. As indicated, DPUM 508 has address inputs from MP 502 and has data inputs/outputs bidirectionally connected from IICI Bus 414.

Local Memory (LM) 510 is a fast access static Random Access Memory (RAM) which is shared between IOC 406, in particular MP 502, and DA 408. LM 510 primarily operates to store and buffer data being transmitted from or received into the SPU 118, that is, from or to the PD 402. Reflecting the shared operation and use of LM 510, LM 510's data inputs/outputs are bidirectionally connected to IICI Bus 414, Device Adapter (DA) Bus 416, and to AI Bus 412 through transceivers (XCVR) 512.

IOC 406 also includes, associated with MP 502, interrupt logic (IL) 514, which receives interrupt inputs from other portions of IIC 404, including DA 408, and from SBI 118. In the present embodiment, IL 514 may include an Intel 8259, designed to operate with MP 502.

Finally, IOC 406 incorporates a number of registers used in the control and execution of I/O communication operations, as will be described in detail in the following. As shown in FIG. 5, the majority of these registers are connected from IICI Bus 414 and are thus accessible by MP 502 and other elements of IOC 406 and AI 410. These registers, which will be described in further detail below, include Identification Register (IDR) 516, Interprocessor Communication Register High (H) and Low (L) (IPCR-H and IPCR-L) 518, Bus Status Register (BSR) 522, Interval Timer (INT) 524, and Bus Control Register (BCR) 528. It should be noted that INT 524 is a counter rather than a register, and that BCR 528 is connected from AI Bus 412. It should be further noted that the data inputs of IPCR-H and IPCR-L 518 are connected from the SPU Bus 120 through AI 410.

C.3.b.2. General Description of AI 410 (FIG. 5)

As previously described, AI 410 performs handshake protocols and provides the functionality necessary to transfer data between SBU Bus 120 and DA 408, including data transfers to and from System Bus 104 through the associated SBI 116. For these purposes, AI 410 includes a plurality of input/output registers connected between AI Bus 412 and SPU Bus 120.

In the output path to SPU Bus 120, AI 410 registers include Output Registers 1 (OR1) 530, Output Registers 2 (OR2) 532 and Output Registers 3 (OR3) 534. Each of OR1 530, OR2 532 and OR3 534 is organized as a High (H) and a Low (L) half register and has data inputs connected from AI Bus 412 and data outputs connected through bidirectional AI Bus Driver/Receiver (AIDR) 536 to SPU Bus 120. AI 412 also includes, associated with OR1 530, AI Counter (AIC) 538, which has data inputs connected from AI Bus 412 and data outputs connected to the data inputs of OR1-H and OR1-L 530. It should be noted that the data inputs of IPCR-H and IPCR-L 518 are connected from SPU Bus 120 through AIDR 536.

In the input path from SPU Bus 120, the AI 410 registers include Input Registers 1 (IR1) 540 and Input Registers 2 (IR2) 542, each of which is again organized as a High (H) and a Low (L) half register. IR1-H and IR1-L 540 and IR2-H and IR-L 542 each have data inputs connected from SPU Bus 120 through AIDR 536 and data outputs connected to AI Bus 412.

Having described IOC 406 and AI 410 at a general level, IOC 406 and AI 410 will next be described in detail.

C.3.b.3. Detailed Description of IOC 406 (FIG. 5)

As described above, all I/O communication operations and functions are initiated and controlled by IIC 404's IOC 406, except the reception of Interprocessor Communication (IPC) messages. That is, IOC 406 controls the operation of the DA 408 and AI 410 and, in turn, is responsive to the CPU 106s of System 102. IOC 406 may initiate reads and writes of System 102 memory, transmit IPC messages to other SPU 118s on the same SPU Bus 120 or to SPU 118s on other SPU Busses 120 through System Bus 104, may perform diagnostic operations, and may perform Direct Memory Access (DMA) operations between a PD 402 and a MEM 108 or LM 510.

In performing these operations, the IOC 406 must first set up the contents of the appropriate output registers to SPU Bus 120, that is, OR1 530, OR2 532 and OR3 534, and the contents of BCR 528. As described below, OR1 530 operates as a memory address register, while OR2 532 and OR3 534 operate as data registers; BCR 528 is used to store the 9 bits of the TI and CC Fields of the C/I Word defining the operation to be performed. The IOC 406 then initiates the I/O communication operation by issuing, as described below, a Start Bus Transfer (SBT) command and an I/O Mapped Command. These commands cause the AI 410 to execute the I/O Bus Command stored in BCR 528. Then, as also described below, IOC 406 checks the contents of BSR 522, which stores information reflecting the state of operation of SPU Bus 120, to determine whether the ordered operation has been completed and SPU Bus 120 is free for a next I/O communication operation.

To describe the operation of the IIC 404, the following will describe the contents and operations of each of the registers residing in the IOC 406 and AI 410, the commands generated by the IIC 404 in executing operations, and the operations of the IIC 404 and system with respect to these registers and commands. It should be noted that, for clarity of presentation, not all control lines and signals are shown in FIG. 5; all necessary control lines and commands will, however, be described in the following.

C.3.b.3a. IDR 516

IDR 516 provides to IOC 406 information identifying the relative physical address of the SPU 118 on the SPU Bus 120, the relative physical address of the SPU 118 determining the relative priority status of the SPU 118 with respect to access to SPU Bus 120. It should be noted that the physical address location information is, in the present implementation, hard-wired to a fixed value by the physical connector connecting the IIC 404 to SPU Bus 120 and that the lower the relative physical address of the SPU 118 on the SPU Bus 120 the higher the relative priority of the SPU 118 for access to the SPU Bus 120. In the present implementation, the SBI 116 of a given SPU Bus 120 is located at physical location 0, thereby providing the SBI 116 with the highest priority of access.

The IDR 516 also provides information indicating, in a device type field, the type of PD 402 and DA 408 contained in the SPU 118. This information is used by the initial program load routines residing in DPUM 510 to verify the type of PD 402 control program loaded into CS 508 at initialization.

C.3.b.3b. BSR 522

BSR 522 stores and provides information pertaining to the current status of the SPU Bus 120 to MP 502, DA 408 and other portions of IIC 404. MP 502 may, in turn and by setting bits in BSR 522, control the execution of I/O communication operations and the operation of DA 408. Associated with BSR 522 is Start Bus Transfer Logic (SBT) 526 which, as described below, provides a means for resetting the SBT bit in BSR 522. As will be described, SBT bit is set by IOC 406, that is, by MP 502 to initiate a communications operation. The SBT bit is thereafter monitored by IOC 406 and is reset through SBTR 526 at the end of the communication to signal to IOC 406 that the communication has been ended. Any given communication may be ended for a number of reasons, including the completion of the operation, the inability to perform the operation, or an error in the execution of the operation. SBTR 526 receives a plurality of inputs, each indicating a condition causing the ending of an operation. For example, one input to SBTR 526 is provided from INT 524 indicating a time-out condition while another is from AIC 538, indicating that a specified number of blocks of data have been transferred in a block transfer. Yet another SBTR 626 input condition is provided from IR1 540 and IR2 542, indicating that IR1 540 and/or IR2 542 have been loaded from SPU Bus 120, thereby completing an operation.

The designation and functions of the 16 bits of bus status information stored in BSR 522 include:

| BIT 15 | EIPCR | Indicates IOC 406 is accepting incoming messages into IPCR 518. Incoming messages will be accepted if this bit is set and IPCR 518 is empty (no message pending). If this bit is reset, all incoming messages are rejected. This bit can be written by MP 502. |
|---|---|---|
| BIT 14 | INT** | Set by MP 502, when requesting interrupt service from a CPU 106. Set by MP 502 Out Instruction "SINT", cleared by IOC 406 when a CPU 106 CLRINT Message is detected by AI 410. This bit may not be modified by loading the status register from MP 502. |
| BIT 13 | SER** | Set by IOC 406 when an incoming system CPU IPC message is rejected by IOC 406. This bit may only be cleared by an Out Instruction "CSER". This bit may not be modified by loading the bus status register from the MP 502. |
| BIT 12 | 32/64 | Set by MP 502 specifying the DMA Transfer Type as being 32 or 64 Bit Transfers to a MEM 108. |
| BIT 11 | LR/SM | Set by MP 502 specifying the DMA Transfer Source or destination as a MEM 108 or LM 510. While in DMA Mode, LM 510 or MEM 106 Addresses are contained in OR1 530. |
| BIT 10 | IOC READY | This bit enables/disables IOC 404's IPCR 518 flag issued to the SBI 116. If reset, the IPCR 518 appears busy to System Bus 104 but not to other SPU 118's on the same SPU bus 120. If set, IPCR 518 is free to accept messages from the SBI 116 provided it is enabled by the BSR (bit 15=1) and not already full. |
| BIT 09 | EIT | Set by MP 502 enabling the INT 564 to start counting up from the previously loaded count value (8 bits) at the rate of 12.5 usec/count, interrupting MP 502 at a count of all one's. |
| BIT 08 | SOI** | If this bit is set, at least one SPU 118 on the I/O SPU Bus 120 has an interrupt pending. SOI is the SPU Bus 120 CPU 106 interrupt line. |
| BIT 07 | IOC/IOC | This bit is set by MP 502, permitting the AI 410 to engage in SPU 118 to SPU 118 data communications. |
| BIT 06 | IOC RD REQ | This bit is used during SPU 118 to SPU 118 data transfers, indicating to the source SPU 118 that the destination SPU 118 is ready for the next data transfer. If set, the destination SPU 118 is ready for the next data transfer. The source SPU 118 resets the IOC RD REQ bit before issuing the next data transfer. |
| BIT 05 | SBT | The Start Bus Transfer bit is set by MP 502, causing AI 410 to execute a previously set up operation. After the requested operation is completed, AI 410 then automatically resets the bit. For all operations, MP 502 must sample the SBT bit and find it reset before attempting another I/O bus operation. |
| BIT 04 | ACK | Acknowledge is a signal received by an IIC 406 engaged in issuing an IPC message to another IIC 406 or System Bus 104 device. ACK set indicates to the transmitting SPU 118 that the target device successfully decoded the IPC command. The ACK bus status bit is only interpreted after the issuing of the IPC and SB IPC commands. In each case ACK is only valid after the SBT bit returns to zero. |
| BIT 03 | BUSY | Busy is a signal received by an IIC 406 engaged in issuing an IPC message to another IIC 406 or System Bus 104 device. Busy, if set, indicates to the transmitting SPU 118 that the target devices IPCR 518 rejected the IPC message data and it must be retransmitted. The Busy bus status bit is only interpreted after the issuing of the IPC and SB IPC command. In each case ACK is only valid after the SBT bit returns to zero. |
| BIT 01 | IOCS | Set to "1" when a DA 408 completes an IIC 406 initiated operation. |
| BIT 02&00 | IOSS1&2 | Spare |

**Note that these Bus Status Bits are not used when the I/O structure use IPC message protocol throughout as described herein, rather than the I/O interrupt.

C.3.b.3c. BCR 528

BCR 528 is a 9 bit register which is used to store and provide the previously described C/I Word. As described, each C/I Word is comprised of a 5 bit CC (Command Code) Field and a 4 bit TI (Target Identification) Field, which are read onto, respectively, CC Bus 208 and TI Bus 206 of C/I Bus 204 during I/O communication operations. BCR 528 is accordingly organized as a 5 bit field and a 4 bit field and C/I Words are written therein as required by IOC 406's MP 502 and through IICI Bus 414 and AI Bus 412. As indicated in FIG. 5, the TI and CC Field outputs of BCR 528 are connected, respectively, to TI Bus 206 and CC Bus 208.

The CC and TI Fields for each of the presently implemented I/O communication operations include:

| I/O Communication Operation | CC Field | | | | | TI Field |
|---|---|---|---|---|---|---|
| | 8 | 7 | 6 | 5 | 4 | 3-0 |
| Write System Memory (W64) | 0 | 0 | 0 | 0 | 0 | S |
| Write System Memory (W32) | 0 | 0 | 0 | 1 | 0 | S |
| Read System Memory (R32) | 0 | 0 | 1 | 0 | 0 | S |
| Read System Memory (R64) | 0 | 0 | 1 | 1 | 0 | S |
| NOT USED | 0 | 1 | 0 | 0 | 0 | |
| Write System Memory (W8) | 0 | 1 | 0 | 1 | 0 | S |
| Test/Set System Memory (R64) | 0 | 1 | 1 | 0 | 0 | S |
| Memory NO-OP | 0 | 1 | 1 | 1 | 0 | |
| Self-Test | 1 | 0 | 0 | 0 | 0 | S |
| NOT USED | 1 | 0 | 0 | 1 | 0 | |
| Data From Memory to IR1 | 1 | 0 | 1 | 0 | 0 | D |
| Data From Memory to IR2 | 1 | 0 | 1 | 1 | 0 | D |
| IOC Read Request | 1 | 1 | 0 | 0 | 0 | D |
| System Bus Error (SBE) ** | 1 | 1 | 0 | 1 | 0 | D |
| IPC Message to IPCR | 1 | 1 | 1 | 0 | 0 | D |
| I/O Initialize (PRG Reset ** | 1 | 1 | 1 | 1 | 0 | D |
| System Bus IPC (W64) | 0 | 0 | 0 | 0 | 1 | S |
| System Bus IPC (W32) | 0 | 0 | 0 | 1 | 1 | S |

It should be noted in the above that the CC Field Codes are expressed in binary form and that, in the TI Fields, the designation S represents a source SPU 118 identification while the designation D represents a destination SPU 118 identification.

As shown in FIG. 5, TI Comparator (TIC) 544 and Command Code Decoder (CCD) 546 are operationally associated with BCR 528. As shown therein, a first input of TIC 544 is connected from TI Bus 206 to receive TI Words appearing thereon and a second input of TIC 544 is connected from the hard-wired relative physical address provided, as previously described, from the connector through which the IIC 404 is connected to SPU 120. As previously described, this relative physical location is used as the identification of the particular IIC 404 on the SPU Bus 120 from which the IIC 404 is connected.

The TIC 544 of an IIC 404 monitors all TI Words appearing on the SPU Bus 120 by comparing the TI Words to the relative physical location input provided from its connector. When there is a match between a TI Word and the relative physical address, TIC 544 generates an output MATCH to indicate that the communication then appearing on the SPU BUS 120, that is, the C/I Word and associated A/D Word, are intended for that SPU 118. In the case of this communication, it should be noted that the A/D Word will contain a message or data, but not an address. Output MATCH is provided to IOC 406 to initiate the execution of an I/O communication operation and, as part of this initialization, is provided to CCD 546 to cause CCD 546 to load the associated CC Word present on CC Bus 208.

As shown in FIG. 5, the input of CCD 546 is connected from CC Bus 208 to receive CC Words appearing thereon. At the receipt of a MATCH signal from TIC 544, indicating that a C/I Word appearing on C/I Bus 204 is intended for that SPU 118, CCD 546 decodes the CC Word present on CC Bus 208 and provides an output indicating the type of I/O operation to be performed. The outputs of CCD 546 are in turn provided to IOC 406 to initiate the indicated I/O operation.

C.3.b.3d. INT 524

INT 524 operates, as well known in the art, to time out certain operations being executed by the I/O structure. INT 524 is an 8 bit timer which may be preloaded to any desired interval by IOC 406, and which will provide an interrupt to IOC 406, and in particular, MP 502 when the selected interval has elapsed.

C.3.b.3e. OR1 530, OR2 532 and OR3 534

OR1 530, OR2 532 and OR3 534 in AI 410 are 32 bit registers used to hold and provide MEM 108 address information to SPU Bus 120 in I/O operations involving MEMs 108, and to hold and provide to SPU Bus 120 data being transferred in an I/O operation. Accordingly, the data outputs of OR1 530, OR2 532 and OR3 534 are connected through AIDR 536 to 32 bit A/D Bus 202.

In I/O operations to or from system memory, that is, to or from an MEM 108, OR1 530 may contain a 32 bit system memory address, that is, an MEM 108 address. This system memory address may be automatically incremented by AIC 538 during DMA type transfers, and, for this purpose, OR1 530 is structure as an 8 bit latch, to contain the 8 most significant address bits, and a 24 bit latch/counter, to contain the 24 least significant address bits.

In Interprocessor Communication (IPC) operations, that is, I/O operations to or from another SPU 118 on the same SPU Bus 120, or System Bus (SB) IPC operations, that is, I/O operations to or from another SPU 118 on a different SPU Bus 120, OR1 530 is used to store and provide control information, as described in the following.

Finally, OR2 532 and OR3 534 are used to hold and provide data to be transmitted in an I/O operation.

C.3.b.3f. IR1 540 and IR2 542

IR1 540 and IR2 542 in AI 410 are 32 bit registers used to receive and hold data transmitted to the SPU 118 in an I/O operation. The data inputs of IR1 540 and IR2 542 are accordingly connected through AIDR 536 from A/D Bus 202.

C.3.b.3g. IPCR 518

IPCR 518 is connected, as described above, from A/D Bus 202 and through AIDR 536 to receive and hold all incoming IPC messages. Unlike IR1 540 and IR2 542, IPCR is not automatically loaded by the reception of an IPC message, that is, an IPC message will not be received until previous messages have been serviced. For this reason, the destination SPU 118 provides control signals ACK and BUSY, previously described, to the source SPU 118 at each attempt to send an IPC message. ACK and BUSY are written into the source SPU 118's BSR 522, where they are sampled by the source SPU 118's IOC 406 to determine whether the message was accepted by the destination SPU 118. The source SPU 118 must continue to attempt to send the message until ACK and BUSY indicate the acceptance of the message. As previously described, IPCR 528 may be reset by either an EIPC or the Ready bits provided from BSR 522. The formats and definitions of the contents of IPCR 528 are determined solely by the messages transmitted and the responses of the IIC 404 to each message are determined by the programs residing in CS 508.

Having described the contents and uses of the IOC 405 and AI 410 registers, certain internal control signals used by IOC 406 to control operation of the IIC 404, and in particular AI 410 will be described next below.

C.3.b.3h. Start Bus Transfer (SBT)

The SBT Command is issued by IOC 406, that is, by MP 502, to initiate an I/O operation after IOC 406 has loaded BCR 528, OR1 530, OR2 532 and OR3 534 with the information appropriate to the operation. AI 410 is responsive to the SBT Command to execute the operation, and IOC 406 determines when the operation is completed by, as described above, examining the contents of BSR 522.

C.3.b.3i. Increment OR1 530

As described above, OR1 530 contains the address fields of MEM 108 and DA 408 addresses and a portion of the addresses contained therein may be incremented by operation of AIC 538. Such address increment operations may be executed during DMA operations involving the associated DA 408 and PD 402. The addresses contained in OR1 530 may be incremented by either 1 or 2, depending upon the DMA operation.

C.3.b.3j. DA 408 Initialize (INIT DA)

INIT DA causes the associated DA 408 to be reset and to assume a power-up initialize state wherein the controlling programs are loaded into the DA 408.

C.3.b.3k. Set Interrupt Bit (SINT)

The SINT Command sets the BSR 522 INT (Interrupt) status bit. When set, the INT bit can be reset only by a reinitialization of the system, or by the issuance of an Clear Interrupt (CLRINT) message by a CPU 110. The purpose of the SINT Command is to set the SPU 118's interrupt line to the associated SBI 116 and thereby to a System 102 CPU 110, thereby in turn informing the CPU 110 that a task has been completed. This command is not required if the system is implemented using IPC messages to indicate task completions, rather than interrupt commands.

C.3.b.3l. Clear Service Status Bit (CSER)

The CSER Command is used to set or reset the BSR 522 Service bit, thereby indicating to IOC 406 that either an SB IPC or an IPC command was received by AI 410 while the SPU 118 was attempting to send an interrupt to a CPU 110. Having described certain internal control signals used by IOC 406 to control operation of the IIC 404, and in particular AI 410, certain interrupt operations will be described next below. It should be noted that not all interrupt operations are described below, certain other interrupts being described in other portions of the present description.

It should also be noted that IOC 406 provides interrupts to, for example, AI 410 and DA 408, as communications indicating certain events and occurrences. In addition, DA 408 may indicate to IOC 406 that a task has been completed by issuing an interrupt to IOC 406's interrupt logic. For example, certain PD 402s are not fully buffered in data transfers and interrupts are essential in coordinating the operations of such PD 408s and the IOC 406.

C.3.b.3m. Memory Related Interrupts

CS 506 may provide IOC 406 with interrupt indications upon the occurrence of parity errors detected therein. In addition, and when a data transfer involving an MEM 108 is being executed, the MEM 108 and SBI 116 may indicate to the IOC 406, through interrupts, of the occurrence of, for example, an illegal memory page crossing, an illegal command, a System Bus 104 parity error, an MEM 108 read parity error, or an MEM 108 address error.

C.3.b.3n. IPCR 518 Load Interrupt

The IPCR load interrupt is generated, as described above, when a received IPC or SB IPC message has been loaded into IPCR 518. Essentially, IPCR 518 is inhibited from loading any further messages until the loaded message has been read.

Having described the operation of the IIC 404, including the contents and operations of each of the registers residing in the IOC 406 and AI 410, the commands generated by the IIC 404 in executing operations, and the operations of the IIC 404 and system with respect to these registers and commands, the I/O operations of the I/O structure will be described in further detail next below.

C.4. I/O Operations

As previously described, the I/O structure of the present invention is capable of executing the following I/O operations:

a) System Memory (MEM 108) Data Reads;
b) System Memory (MEM 108) Data Writes;
c) System Memory (MEM 108) Test/Set Read;
d) Transmit Local IPC Message (an IPC to an SPU 118 on the same SPU Bus 120);
e) Self-test;
f) Transmit Remote System Bus IPC Messages (IPC commands to SPU 118s on other SPU Busses 120);
g) Read Request (handshake used in SPU 118 to SPU 118 data communications);
h) Initialize (programmable reset sourced by an SBI 116);
i) SPU 118 to SPU 118 Data Communications; and
j) DA 408 To/From System Memory (MEM 108) or Local RAM (LM 510) DMAs.

The following will describe and define the operations executed in performing the above described I/O operations in further detail than that previously presented.

C.4. a. System Memory Reads (FIG. 6A)

There are two types of System Memory Read modes supported by the I/O structure, a single word (32 bits) and a double word (64 bits) system memory read. In each case the IIC 404 issues a 32 bit System Memory Address located in OR1 530 along with the contents of the Bus Control Register (BCR) 528. As previously described, BCR 528 contains both a CC Word and a TI Word (ID). The operation is begun by the issuing of Start Bus Transfer (SBT) Out instruction, and completion of the transaction is determined by interrogation of the Bus Status Register's (BSR) 522 SBT bit (SBT=1=in-process), SBT=0=completed). The contents of the various registers in this operation are illustrated in FIG. 6A and the following procedure is employed to perform I/O Bus System Memory Read operations:

a) The IIC 404 must set-up BCR 528 and Output-Registers 1 (OR1) 530 with the appropriate information;
b) The IIC 404 enables System Bus Error Interrupts;
c) The IIC 404 writes issues an SBT;
d) The IIC 404 interrogates the BSR 522's SBT bit awaiting completion of the transaction; and,
e) When the IIC 404 finds the BSR's SBT bit=0, then the read data is in IR1 540/IR2 542.

C.4.b. System Memory Writes (FIG. 6B)

There are three different types of system memory write operations supported by the I/O structure: a byte write, a single word (32 bit) write and a double word (64 bit) write. Each write operation issues a system memory (MEM 108) address located in OR1 530 and output data located in OR2 532 or OR2 532 and OR3 534. Byte writes and single word writes use OR1 530 and OR2 532 while double word writes use OR1 530, OR2 532 and OR3 534. BCR 528 again contains both a TI Word and a CC Word and the operation is begun by the issuance of an SBT by the IOC 406. Completion of the operation is again determined by interrogation of the BSR 522 SBT bit. The contents of the various registers are illustrated in FIG. 6B and the following procedure is executed to perform system memory write operations:

a) The IIC 404 sets up BCR 528, OR1 530 and OR2 532 and, if necessary, OR3 534;

b) The IIC 404 enables System Bus Error Interrupts;

c) The IIC 404 issues an SBT command;

d) The IIC 404 interrogates the BSR 522's SBT bit for completion of the operation; and, e) When the IIC 404 finds the BSR 522's SBT bit=0, then the write data contained in OR2 532 and OR3 534 has been transferred.

C.4. c. InterProcessor Communications Message (local IPC) (FIG. 6C)

Referring to FIG. 6C, the IPC message, or command, is utilized as a method of passing control information between SPU 118s physically located on the same SPU Bus 120, or from a device on System Bus 104 to a device located on a SPU Bus 120, using IPCR 518 for this operation. Unlike data input registers IR1 540 and IR2 542, IPCR 518 is protected from being overwritten. The source IIC 404 must load the desired IPC message into OR1 530 and the TI Word and CC Word into BCR 528. The operation is initiated by the issuing of an SBT Command. An IIC 404, after issuing a IPC command to another SPU 118 on the same SPU Bus 120, must first interrogate its BSR 522 SBT to determine if the attempt at the IPC communication was completed, and then must interrogate its' BSR 522 to determine if the IPC message was accepted or rejected. The "Acknowledge" (ACK) and "Busy" signals, which appear in bits 4 and 3 of BSR 522 respectively, and the meanings of which are illustrated in FIG. 6C, indicate to the IIC 404 if the IPC transfer was successful.

An accepted IPC command causes an IPC Interrupt, alerting the IIC 404's MP 502 that the IPCR 518 is full. IPCR 518 cannot be loaded again until the IOC 406 reads the contents of the register. If the IOC program desires to inhibit IPC interrupts, IPCR 518 can be disabled or blocked from accepting messages by resetting the EIPC BSR 522 bit.

The contents of the various registers are illustrated in FIG. 6C and the following procedure is executed to perform an IPC message operation:

a) The IIC 404 sets up BCR 528 and OR1 530; the IPC message format is defined by the IIC 404's program and can change without affecting the operation itself;

b) The IIC 404 issues an SBT command;

c) The IIC 404 interrogates BSR 522's SBT bit for completion of the operation;

d) When IIC 404 finds the BSR 522's SBT bit=0, then IIC 404 must interrogate the BSR 522's ACK and BUSY bits to determine if the message was accepted or rejected.

C.4. d. Self-Test (FIG. 6D)

This operation is used for diagnostic purposes. Self-Test transfers the contents of OR2 532 and OR3 534 out and onto System Bus 104, then back in through SBI 116 and into IR1 540 and IR2 542, respectively.

The contents of the various registers are illustrated in FIG. 6D and the following procedure is executed to perform a Self Test operation:

a) The IIC 404 sets up BCR 528 and OR2 532 and OR3 534;

b) The IIC 404 issues an SBT;

c) The IOC 404 interrogates the BSR 522's SBT bit for completion of transaction;

d) When the IIC 404 finds the BSR's SBT bit=0, then the write data contained in OR2 532 and OR3 534 has been transferred to IR1 540 and IR2 544, respectively.

Another possible Self-Test transfer path is to transfer the contents of OR1 530 to either IR1 540, IR2 542 or IPCR 518; the procedure is similar to that described above.

C.4.e. Test/Set (FIG. 6E)

The Test/Set operation is essentially an I/O controller double word (64 bits) system memory read operation. The difference in this command is how the SBI 116 handles the system memory read data. SBI 116 first retrieves the system memory double word data specified by the system memory address contained in OR1 530. Then, before releasing control of System Bus 104, SBI 116 sets the retrieved double word's Most Significant Bit and writes the modified word back into the same system memory location. SBI 116 then returns the unmodified double word retrieved from system memory to the SPU 118 which initiated the operation.

The purpose of this operation is to provide the SPU 118 with a semaphore command. That is, if the SPU 118 performs a Test/Set and the MSB of the data read is a "one", then another device has control of the system bus. Should the MSB be a "zero", then the SPU 118 has gained control and any other device sampling the same location and attempting to gain control will find the MSB already a "one", indicating that the SPU 118 has control.

The contents of the various registers are illustrated in FIG. 6E and the following procedure is executed to perform a TEST/SET operation:

a) The IIC 404 must set up BCR 528 with the TEST/SET CC Word and a TI Word identifying itself and must load OR1 530 with a system memory (MEM 108) address;

b) The IIC 404 then enables System Bus Error Interrupts;

c) The IIC 404 then issues an SBT command;

d) The IIC 404 then interrogates the BSR 522's SBT bit for completion of transaction; and, e) When the IIC 404 finds the BSR's SBT bit=0, then the read data is in IR1 540/IR2 542.

C.4.f. IOC Read Request (SPU 118 to SPU 118 Data Transfers On The Same SPU Bus 120 (FIG. 6F)

Read Request is a command that is only used during data communications between two SPU 118s located on the same SPU Bus 118. The Read Request command serves as a response command issued from a destination SPU 118 to the source SPU 118 to indicate that the destination SPU 118 is ready for the next data transfer. No actual data is transferred with this command, and the Read Request command is presently used during SPU 118 to SPU 118 block transfers.

There are two different types of SPU 118 to SPU 118 transfers available Read Request command. One is a block transfer performed by the SPU 118's DA 408 while the second is block transfer controlled by the SPU 118's IOC 406 on a double word per transaction basis. In the case of the block transfer mode under DA 408 control, BCR 528 is to be set up prior to the IOC 406 initiating the DA 408 to begin the DMA block transfer. As the DA 408 engages in the exchange of data, the SPU 118's AI 410 automatically issues the Read Request command at the appropriate times. The block transfer performed under the control of the SPU 118's IOC 406 involves the IOC 406 setting up BCR 528 with the Read Request and the sampling of BSR 522 to determine when the SPU 118's IR1 540 and IR2 542 contain data. After retrieving the input data, the IOC 406 then must issue the Start Bus Transfer requesting the next transfer.

The contents of the various registers are illustrated in FIG. 6F and the following procedure is executed to perform a Read Request operation:

a) The destination IOC must set up the Bus Control Register with the IOC Read Request command and the source I/O address. The OR1 need not be loaded with any data prior to the issuing of the command, for even though the I/O will transfer its contents onto the I/O bus, the targetted I/O will not load its IR1 during the I/O bus operation.

b) The IOC writes (data = anything) to the Start Bus Transfer port (SBT).

c) The IOC interrogates the BSR's SBT bit for completion of transaction.

d) When the IOC finds the BSR's SBT bit=0, then the I/O Bus operation has been completed.

C.4. g. System Bus (SB) IPC (FIG. 6G)

This operation permits the transfer of data contained in a source SPU 118's OR2 532 and OR3 534 to be transferred across the system bus, that is, System Bus 104, to another SPU 118's IR1 540 and IR2 542 resident on a different SPU Bus 120. The SB IPC functions similarly to the local IPC in that the ACK and BUSY BSR bits along with the SBI bit indicate the acceptance or rejection of the operation. Although the target SPU 118's IR1 532 and IR2 534 do not provide the ACK and BUSY response, the SBI 116s participating in the execution of the SB IPC issye ACK and BUSY status response during communications to prevent bottlenecks. Either destination SBI 116 or the destination SPU 118 could reject the source SPU 118's SB IPC attempt. In the case of rejection, the source SPU 118 must reissue the command.

FIG. 6G illustrates the interpretation of the ACK and BUSY bits in BSR 533 in an SBC IPC and it should be noted that BSR 522 bits 4 and 3 are only valid when the BSR 522's SBT bit 6 returns to zero, indicating the issued SB IPC command has completed.

The SB IPC double word (64 bit) operation consists of three bus cycles transferring the contents of the SPU 118's OR1 530, OR2 532 and OR3 534 to a source SBI 116, OR1 530 contains system bus addressing and command information, while data resides in OR2 532 and OR3 534. The SB IPC data command is only used after the two involved SPU 118s have established an agreement via previously issued SB IPC control messages. The information stored in OR1 530 is interpreted by the source SBI 116 to enable it to direct the data to the destination SBI 116 and finally the destination SPU 118.

The contents of the various registers are illustrated in FIG. 6G and the following procedure is executed to perform an SB IPC operation:

a) The IOC 406 sets up BCR 528, OR1 530, OR2 532 and OR3 534;

b) The IOC 406 enables System Bus Error Interrupts;

c) The IOC 406 issues an SBT command;

d) The IOC 406 interrogates BSR 522's SBT bit for completion of the I/O bus transaction; and, e) When the IOC 406 finds BSR 522's SBT bit=0, then the IOC 406 must interrogate BSR 522's ACK and BUSY bits to determine if the message was accepted or rejected.

C.4. h. System Bus (SB) IPC (W32) (Remote IPC Message, Control or Data Transfer (FIG. 6H)

The System Bus IPC single word (32 bits) operation has four variations, all of which involve transactions across the system bus, that is, System Bus 104. Each of the four types of SC IPC's transfer the contents of the OR1 530 and OR2 532 to SBI 116. As in the SB IPC double word command, the ACK and BUSY BSR bits indicate the acceptance or rejection of the command.

FIG. 6H illustrates interpretation of the ACK and BUSY bits BSR 522 and it should be noted that BSR 522 bits 4 and 3 are only valid if BSR 522's SBT bit 6=0, indicating the issued SB IPC command has completed.

All four versions of the single word SB IPC command appear identical at the source SPU BUS 120 level. However, at the SBI 116 and System Bus 104 level each command type results in a separate system bus operation. The different System Bus commands are encoded in the SPU 118's OR1 word and are not interpreted at the SPU Bus 120 level. As in the previously discussed SB IPC double word command, OR1 530 contains system bus addressing and command information rather than a system memory address. Depending on the system bus target and command specified in OR1 530, the data present in OR2 532 is directed to different system bus device destinations. The four types of SB IPC single word commands are as follows:

(A) SB IPC control Message—targets a system bus CPU 110 or Console Unit (SCU) 112/114. This type of command is used for the passing of control information and the formatting of the message portion of the OR1 530 and OR2 532 are subject to software and the destination device specification.

(B) SB IPC Control Message—targets a IPCR 518 register located on a different SPU Bus 120. This command is used for the passing of control information between IOC 406s and the formatting of the message portion of the OR1 530 and OR2 532 are subject to program control.

(C) SB IPC Response Message—targets ans SPU 118 I/O located on a different SPU Bus 120 and is employed during SPU 118 to SPU 118 data transfers indicating to a source SPU 118 that the destination SPU 118 is prepared for the next data transfer.

(D) IPC Data Transfer—targets an SPU 118's IR1 540 located on a different SPU Bus 120.

the contents of the various registers are illustrated in FIG. 6H and the following procedure is executed to perform an SB IPC single word operation:

a) The IOC 406 sets up BCR 528, OR1 530 and OR2 532;

b) The IOC 406 enables System Bus Error Interrupts;

c) The IOC 406 issues an SBT command;

d) The IOC 406 interrogates BSR 522's SBT bit for completion of the transaction; and, e) When the IOC 406 finds the BSR 522's SBT bit=0, then the IOC 406 must interrogate the BSR 522's ACK and BUSY bits to determine if the message was accepted or rejected.

C.4. i. Initialize (Programmable Reset) (Note: No FIG. 6I)

The I/O Initialize command can only be issued onto the I/O bus by the System Bus Interface board. The command provides the system bus devices, specifically the CPU and SCU, the capability to selectively initialize or reset an individual I/O controller. Execution of this command causes both the IOC and Device Adapter portions of the I/O controller to restart as if they were powered up. Any operation in progress will be lost. To perform an I/O Initialize command the SBI places an I/O initialize command code, the desired I/O address (ID) onto the I/O bus and asserts the I/O bus signal "SEL INIT". No data is deposited onto the I/O bus during this bus operation.

C.4. j. SPU 118 To SPU 118 Data Communications (FIG. 6J)

The present I/O structure supports data block transfers between SPU 118s without involving system memory, that is, MEM 108s. Three basic types of SPU 118 to SPU 118 data transfers are currently supported by the IO structure:

(1) Device Adapter (DA) 408 to/from DA 408;
(2) DA 408 to/from IOC 406; and,
(3) IOC 406 to/from IOC 406.

The procedures and register formats necessary to perform SPU 118 to/from SPU 118 data block transfers for the three separate cases are as follows:

DA 408 to/from DA 408

Version (1) consists of blocking data from one SPU 118's DA 408 directly into or out from another SPU 118's DA 408 under the control of the DA 408s and AI 410s. DA 408 to DA 408 block transfer is initiated by a source IOC 406 issuing an IPC command to another IOC 406 requesting a block transfer. All of the three types of block transfers must have at least one IPC message passed between the IOC 406's before engaging in a block transfer. The format and number of IPC messages passed between IOC 406s prior to the execution of the block transfer is determined by the IOC control programs. Once the IOC 406s have exchanged the necessary control parameters, both the source and destination IOC 406s must set the "IOC/IOC" BSR 522 bit 7 and load their BCRs 528 before starting the DA block transfer as illustrated in FIG. 6J.

It should be noted that a DA 408 to DA 408 block transfer operation does not require the passing of OR1 530 (Memory Address) information; therefore the OR1 531 need not be loaded by the IOC 406 prior to the start of the transfer. The source SPU 118, once the transfer is in process, transmits only the OR2 532 and OR3 534 data to the destination SPU 118's IR1 540 and IR2 542. The destination DA 408 detects the input data, processes it and then issues an IOC Read Request command back to the source DA 408 requesting the next data transfer in the block. This procedure continues until the entire block (the size specified in the IPC messages) is transferred.

DA 408 to/from IOC 406

Version (2) permits blocking data from one SPU 118's IOC 406 to or from another SPU 118's DA 408. One SPU 118 therefore under IOC 406, that is, MP 502, control while other is under DA 408 control. The SPU 118 under DA 408 control must be set up by its IOC 406 as described in the previous section (version 1) prior to the start of the block transfer. The SPU 118 under IOC 406 control uses a different protocol to perform the block transfer operation. In the SPU 118 under IOC 406 control, two BSR 522 bits called "IOC/IOC" and "IOC RD REQ" (bits 7 and 6) are used to control the flow of data to and from the SPU 118s. The IOC 406 controlled SPU 118 may be either the source or the destination.

If the IOC 406 is a source:

a) The IOC 406 must set BSR 522's IOC/IOC bit 7, previously described;

b) The IOC 406 must set up the BCR 528, as previously described, and OR2 532 and OR3 534;

c) The IOC 406 issues an SBT command; and d) Instead of interrogating the BSR 522's SBT bit for completion of the operation, the BSR 522's IOC RD REQ bit 6 is interrogated. That is, it is not enough to know that the OR2 532 and OR3 534 data has been transferred. The destination SPU 118 must be ready to accept the next data word before the source SPU 118 can be allowed to transmit. Thus, when the IOC 406 detects that BSR 522 bit 6 is set, then the IOC 406 is free to attempt the next data transfer. Before the source IOC 406 issues the next transfer, the BSR 522 bit 6 must be reset to prepare for the next READ REQUEST signal.

If the IOC is the destination:

a) The IOC 406 must set BSR 522 IOC-IOC bit 7;

b) The IOC 406 sets up BCR 528;

c) The IOC 406 then interrogates the BSR 522's IOC RD REQ bit 6 waiting for it to become set. If a one, this indicates to the IOC 406 that IR1 540 and IR2 542 have been loaded by the source SPU 118 I/O and should be unloaded;

d) To allow the source SPU 118 to issue the next data transfer, the IOC 406 issued an SBT command to cause its associated AI 410 to issue the a READ REQUEST command.

IOC 406 to/from IOC 406

Version 3, which is a block transer between two IOC 406's, follows the same procedure outlined in version 2. One IOC 406 follows the source IOC 406 procedure while the other follows the destination IOC procedure 406.

Figure 6K:
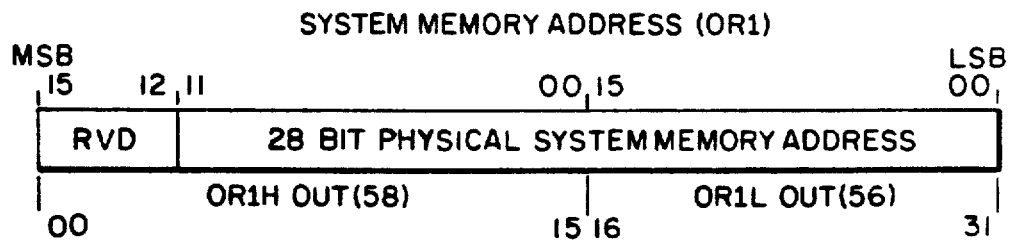

C.4. j. DA 408 To/From MEM 108 Or LM 510 Transfers (FIG. 6K)

DA 408 to/from System Memory (Mem 108) or LM 510 Direct Memory Accesses (DMA's) allow DA 408 data to transfer directly to/from an MEM108 without intervention on the part of a CPU 110 or the SPU 118s' IOC 406. As previously described, the system memory address counter/register (AIC 538/OR1 530) resides in the AI 410 section and is therefore not loadable by DA 408. This means that all new DMA system memory addresses must be loaded into OR1 530 by the IOC 406 prior to start of a DA 408 DMA. In this regard, it should be noted that the system memory is partitioned into 2Kbyte pages. Whenever OR1 530 counts up to 2Kybtes during a DMA transfer, a page break signal "MA10" is issued to DA 408 signalling a System Memory Page Crossing. AI 410 will automatically block the accessing of SPU Bus 120 and the DA 408 will attempt another transfer. Once this blocking is activated, the issuing of the OR1 530 (that is, load of the OR1 530 by the IOC 406) releases AI 410 for bus accesses. The page crossing mechanism can be inhibited by the DA 408 during the DMA transfer. Exercising this function allows the DA 408 to perform DMA transfers greater than 2Kbyte and could be useful, for example, in tape DMA transfers.

To perform a DMA between system memory and a DA 408:

a) The IOC 406 must set up OR1 530, BCR 528 and BSR 522 prior to the start of the DA 408's DMA. As the DMA data is moved into or from system memory, AI 410 automatically increments the system memory address residing in OR1 530 to point at the next system memory address; The BCR 528 must then be loaded with the appropriate CC and TI Words. For Single/-Double Word DMA to System Memory, the BSR'522s 32/64 bit 12 must be set or reset prior to the DMA transfer to determine whether it will consist of single (bit 12=1) or double (bit 12=0) word transfers. Also, the BSR 522's LR/SM bit 11 must be set or reset to select either the LM 510 area (bit 11=1) or System Memory (bit 11=0) as a source/destination for the DMA. These flags are used by the AI 410 to regulate SPU Bus 120 accesses and OR1 530 updating during DA 408 DMA operations.

b) The IOC 406 must enable completion and time out (INT 524) interrupts.

c) The IOC 406 then issues the necessary DA 408 control informaton to initiate the DMA. The content and order of these IOC commands is a function of the specific type of peripheral attached and individual procedure is determined by the requirements of the specific PD 402 and DA 408;

d) Once the DA 408 has started the DMA, the IOC may not access either SPU Bus 120 or the DA 408. When the DA 408 completes the operation, a Completion interrupt is issued to the IOC 406. The IOC 406 then samples the DA 408's device status register to determine the status of the DMA operation.

Having described the IOC 406 and AI 410 of an IIC 404, and the operations performed thereby, DAs 408 and the means by which access to SPU Bus 120 is arbitrated by the SPU 118s attached therefrom will be discussed next below.

C.5. DAs 408s

As previously described, each IIC 404 includes, in addition to an AI 410 and a possible IOC 406, a Device Adaptor (DA) 408. As described above, IOC 404 provides the functionally to control and direct the I/O communications operations of the SPU 118, while DA 408 and AI 410 provide control and communication interfaces to, respectively, the PD 402 and SPU Bus 120.

As also previously described, in the presently preferred embodiment of IIC 404, both IOC 406 and AI 410 are common among many, and preferably most, IICs 404. Because of the differing interface and operational requirements of the various PDs 402, however, the DAs 408 will differ among the IICs 404 and the design and operation of a particular DA 408 will depend upon the particular PD 402 connected therefrom. In this respect, it should be noted that the functions performed by IOC 406 include certain control operations with respect to the associated PD 402. Because of this, at least portions of the operation performed by an IOC 406 are determined by programs loaded into an IOC memory from System 102. In addition, in the presently perferred embodiment of IICs 404, certain IICs 404 will not, due to the particular design of the associated PDs, include an IOC 406. In these embodiments, the PD 402 will include the functionality to provide the control functions otherwise performed by the IOCs 406.

The structure and operations of peripheral device controllers, for example, for a monitor, terminal, disk or tape drive, or telecommunications link, are well known to those of ordinary skill in the art. In addition, the necessary control and data interfaces and operations of any particular DA 408 will respect to an IOC 406 and AI 410 will be well understood by those of ordinary skill in the art after the above descriptions of IOC 406 and AI 408 and the operations thereof.

As such, DAs 408 will not be described in further detail therein; the control and data interfaces between IOC 406 and AI 410 and a DA 408 are described, however, in the attached Appendix to further aid the reader in understanding the functional requirements and design of a DA 408.

C.6. Aribitration of Access To SPU Bus 120 By SPUs 118

The above descriptions have stated that the SPUs 118 connected from an SPU Bus 120 must gain access thereto in order to execute an I/O operation. The means and method by which SPUs 118 gain access to SPU Bus 120 will not, however, be described in detail herein as not being pertinent to the present invention. It is suggested, however, that, for example, any of the daisy chain bus access arbitration schemes well known to those of ordinary skill in the art may be employed for this purpose. In further example, the bus access method described in the following description of System Bus 104 may be used with respect to SPU Bus 120.

D. System 102 Internal Bus, General Structure and Operation (FIG. 1)

As previously stated, System 102's internal bus structure, that is, System Bus 104 and SBP Bus 106, will now be described to provide an example of a setting in which the I/O structure may operate. Following the description of System 102's internal bus structure, the interface between I/O structure and System 102's internal bus structure, that is, SBI 116, will be described.

Returning to System Bus 104, as described above System Bus 104 is the means through which the internal elements of System 102 communicate. In the present embodiment of System 102, an as shown in FIG. 1, System Bus 104 is a linear bus with each of the internal elements of System 102 connected therefrom, the connections to System Bus 104 being undirectional or bidirectional as required by the function of the element. System Bus 104 may be extended as required by the particular configuration of a System 102, that is, to add or subtract system elements or to connect two or more System 102's into a single system.

it should be noted that, as described below, the logical configuration of System Bus 104 is defined by SBP Bus 106 and may assume any topological structure required by the function of System 102. For example, System Bus 104 may physically arranged in loop and star configurations. In the loop configuration, the ends of System Bus 104 are tied together to form a closed loop from which System Elements (SEs) are connected. In the star configuration, System Bus 104 is comprised of a number of bus segments radiating from a common junction and SEs are connected from the radiating segments as required by the system configuration.

D. 1. System Bus Priority (SBP) Bus 106 (FIG. 1)

Referring again to FIG. 1, as described in detail further below SBP Bus 106 is the means through which the System 102 elements connected to System Bus 104 determine access to System Bus 104. As shown in FIG. 1, in the present example SBP Bus 106 forms a loop with all of the elements connected from System Bus 104 being serially connected in SBP Bus 106 loop.

It is assumed, in the exemplary System 102 presented herein, that all processing elements connected from System Bus 104 may have the capability to independently initiate interprocessor communications; thus all elements connected from System Bus 104 are shown as connected in the SBP Bus 106 loop. In certain cases, for example, memory elements, the processing elements may be such that they do not initiate interprocessor communications but will only receive and respond to succh communications. Such elements will require access to System Bus 104 to receive such communications and to respond to such communications, for example, by reading data from a memory element to a CPU element, but will not be required to claim access to System Bus 104, that is, access to System Bus 104 will be provided by the element sending the communication being responded to. In such cases, these "response only" elements need not be connected in the SBP Bus 106 loop but will be connected to System Bus 104.

As described below, priority of access to System Bus 104 is passed from one element of System 102 to the next element in the SBP Bus 106 loop in a "rotating daisy chain". That is, if a given element currently has access to System Bus 104, the next element along the SBP Bus 106 loop following the current element has the highest priority for next access to System Bus 104, followed by the next element along SBP Bus 106, and so on around the SBP Bus 106 loop until the current element is reached again. When the element currently having access releases System Bus 104, the opportunity to gain next access to passed through SBP Bus 106 to the next element along SBP Bus 106. That next element may take access to System Bus 104 or, if it does not do so, passes the opportunity for access to its next element along SBP Bus 106, and so on until the element originally having access is reached again or some element along SBP Bus 106 takes access to System Bus 104.

In order of priority of access to System Bus 104 thereby rotates around SBP Bus 106 with each element in turn having an opportunity to gain access to System Bus 104. Thus the average priorities of access to System Bus 104 of all elements connected thereto will be equal, with the relative priorities of the elements at particular points in time being determined by their positions along SBP Bus 106 relative to the element currently having either actual access to or the right to access System Bus 104.

Because of the rotating shifting of access priority to System Bus 104 among the elements of System 102 connected from SBP Bus 106, the elements connected to System Bus 104 do not contend for access to System Bus 104 and are all regarded as peers with respect to System Bus 104 access. As a result, each element connected to System Bus 106 and SBP Bus 106 has an equal opportunity to gain access to System Bus 104 and no element can be locked out of access to System Bus 104 for an extended period.

Moreover, and again because of the rotating shifting of access priority to System Bus 104 among the elements of System 102, the position of a System 102 element along either SBP Bus 106 or System Bus 104 has no bearing on the average priority of that element to access System Bus 104. That is, and as described above, all elements connected to System Bus 104 and in the SBP Bus 106 loop are peers having, on the average, equal access rights to System Bus 104. As such, an element may be added to System 102, or moved from one point along System Bus 104 and SBP Bus 106 to another, without effecting the average relative priorities of access to System Bus 104 of that element or any of the other elements connected to System Bus 104.

In this regard, SBP Bus 106 is represented in FIG. 1 as comprising a simple, clockwise loop with each element of System 102 being connected in series around the loop. It should be noted, however, that this representation is selected only for clarity of presentation. The elements of System 102 connected from System Bus 104 may, in fact, be connected in series along SBP Bus 106 in any desired order.

Finally, a second element of SBP Bus 106 is illustrated in FIG. 1 and referred to as Local Priority Link (LPL) 124. LPL 124 is essentially a means by which the relative priorities of elements interconnected through LPL 124 may be fixed, as opposed to the rotating priorities determined by SBP Bus 106. As will be described in detail in a following description of the SBP Bus 106 element residing in each element connected therefrom, LPL 124 allows the fact of a pending requirement for access to System Bus 104 by one element to be passed to another element connected along a LPL 124 to inhibit any pending accesses to System Bus 104 in the second element.

D. 2. System 102 Internal Bus Structure (FIG. 7)

Figure 7:
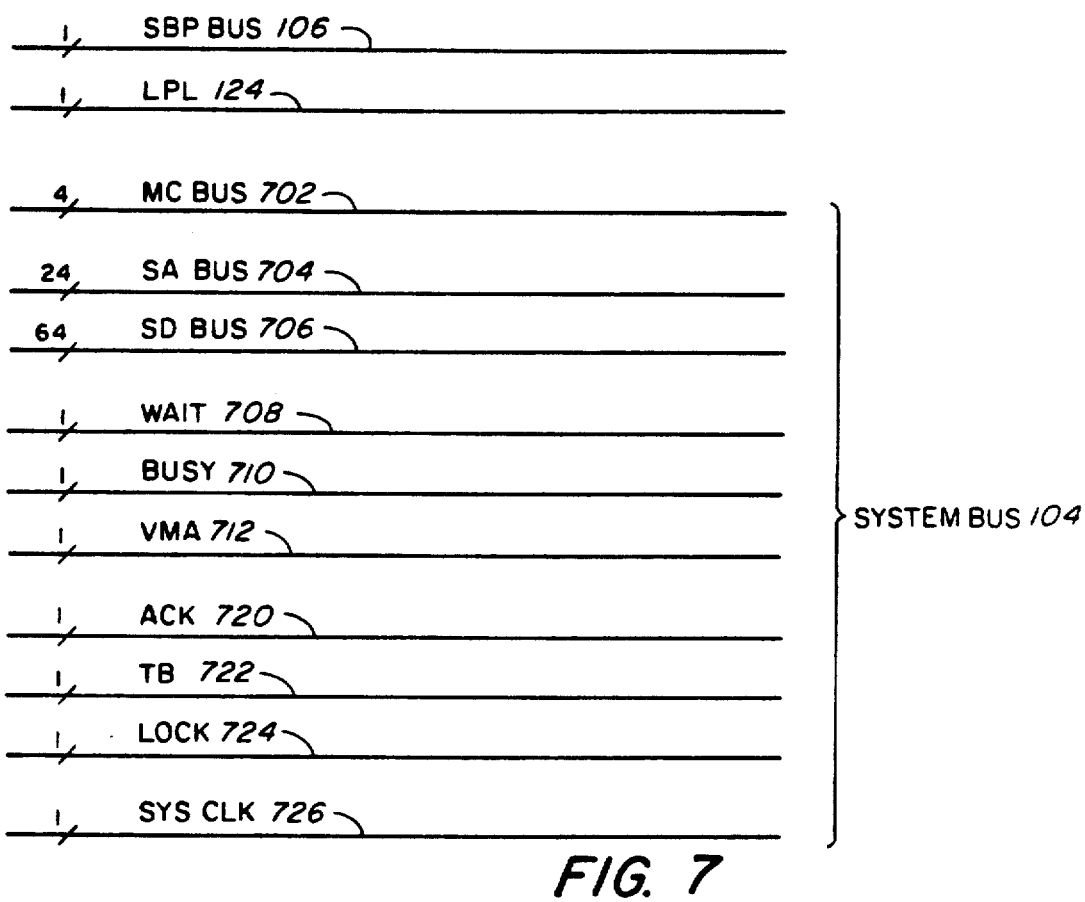
FIG. 7 is a diagram of the internal bus structure of the exemplary system.

Referring to FIG. 7, therein is presented a diagrammic representation of System Bus 102's internal bus structure. As described above and shown in FIG. 1, this structure includes System Bus 104, SBP Bus 106 and, in certain cases, an associated LPL 124.

D. 2. a. Memory Control Bus 702: Memory Operations and Interprocessor Communications As shown in FIG. 7, System Bus 104 includes a plurality of multiple and single line sub-busses. The first of these sub-busses is Memory Control (MC) Bus 702 which, upon the occurrence of a System 102 element obtaining access of System Bus 104, is used to communicate the type of System Bus 104 operation to be performed.

That is, when an element takes control of System Bus 104 that element signals this access by driving SBP Bus 106 to a state indicative of this fact and places on MC Bus 702 a code indicating the type of System Bus 104 operation to be performed. The elements of System 102 connected to System Bus 104 detect the occurrence of a System Bus 104 access by monitoring the state of SBP Bus 106 and, when an access is indicated, determine the type of System Bus 104 operation to be performed by reading the code placed on MC Bus 702 by the element having access to System Bus 104.

Most System Bus 104 operations are memory related, that is, are reads from or writes to MEMs 108. As such, and as will be seen below with reference to the MC Bus 702 codes, the entire class of non-memory related operations are indicated by a single code indicating that an "interprocesser" communication is to be executed, that is, a communication between two non-memory elements, such as an SBI 116 band a CPU 110. As described below, the elements connected to System Bus 104 must be in such cases refer to other of the System Bus 104 sub-busses to determine and execute interprocessor communications.

The MC Bus 702 codes provided in the present implementation of System 102 include:

| CODE | TYPE OF OPERATION |
|---|---|
| 0 | No operation; |
| 3 | Read the contents of an MM 108 control register; |
| 4 | Read a quad word (16 bytes) of information from a specified MM 108 address location; |
| 5 | Read an octal word (32 bytes) of information from a specified MM 108 address location; |
| 6 | Read a double word (8 bytes) of information from a specified MM 108 address location; |
| 7 | Read a word (4 bytes) of information from a specified MM 108 address location; |
| 8 | Perform an inter-processor communication; |
| B | Write to an MM 108 control register; |
| C | Write a byte into a specified MM 108 address location; |
| D | Write a half word (2 bytes) into a specified MM 108 address location; |
| E | Write a double word into a specified MM 108 address location; and, |
| F | Write a word into a specified MM 108 address location. |

It should be noted that the above codes are presented in hexidecimal form and that codes 1, 2, 9 and A are reserved for future use.

Interprocessor communication (Code 8) are thereby executed as a default case from memory related operations. That is, a short "decision branch", a reference to a code on MC Bus 702, is provided to identify and initiate memory related operations while a longer "decision branch", that is, a reference to further information on other sub-busses of System Bus 104, is required for non-memory related operations. This method thereby effectively increases the speed with which the majority of System Bus 104 operations, that is, memory related operations, may be initiated and executed by providing a shorter decision path for suchy operations while retaining flexibility in defining and executing all types of System Bus 104 operations.

D.2.b. System Address (SA) Bus 704 and System Data (SD) Bus 706

The next major sub-busses of System Bus 104 are System Address (SA) Bus 704 and System Data (SD) Bus 706. Considering first memory related operations, SA Bus 704 is the means by which read and write addresses are communicated between elements requesting memory operations and the MEMs 108 executing the operations while SD Bus 706 is the means by which information is communicated between the MEMs 108 and the other elements of System 102.

D.2.b.1. Memory Operations

In a memory operation, as described above the System 102 requesting a memory operation first gains access to System Bus 104 through the operation of SBP Bus 106, described in further detail below, and places an appropriate MC Bus 702 code on MC Bus 702 to indicate the type of operation to be performed. The requesting element then places the read or write address onto SA Bus 704 and, if the operation is a write, places the data to be written onto SD Bus 706. The addressed MEM 108 then writes the data into the corresponding storage location therein. If the operation is a read, the addressed MEM 108 reads the information from the addressed storage location and places the information on SD Bus 706, from which the information is read by the requesting element. In the present implementation of System 102, for example, SA Bus is 24 bits wide, expandable to 31 bits, while SD Bus 706 is 64 bits, or a double word, wide.

Associated with SA Bus 704 and SD Bus 706 are three further single line sub-busses whose primary functions related to memory operations. The first of these is WAIT 708. This signal is asserted by an addressed MEM 108 during a memory read operation if the requested information is not available and is monitored by the requesting element, which may accordingly go into a wait mode until the information becomes available.

The second memory operation control is BUSY 710, which is asserted by an addressed MEM 108 during a memory operation and before a System Bus 104 transmission is initiated. BUS 710 indicates that System Bus 104 is not available and is monitored by the elements of System 102.

The third memory operation control is Valid Memory Access (VMA) 712, which is asserted by an addressed MEM 108 to indicate that a requested memory operation is valid, that is, that the address or data are valid. VMA is monitored by the element requesting the memory operation to determine whether the request was successful, that is, valid.

D.2.b.2. Interprocessor Communications (FIG. 7A)

Now considering non-memory related operations, that is, interprocessor communications, SA Bus 706 and SD Bus 706 operate differently in certain respects from that described above when an interprocessor operation is to be performed. As described above interprocessor operations are treated as a default from memory related operations. That is, a single MC Bus 702 code indicates the entire class of non-memory type operations. As also described above, upon the appearance of the interprocessor communication code on MC Bus 702 the elements connected to System Bus 104 must refer to information presented on SA Bus 704 and SD Bus 706 by the requesting element to determine the type of interprocessor operation to be executed.

Figure 7A:
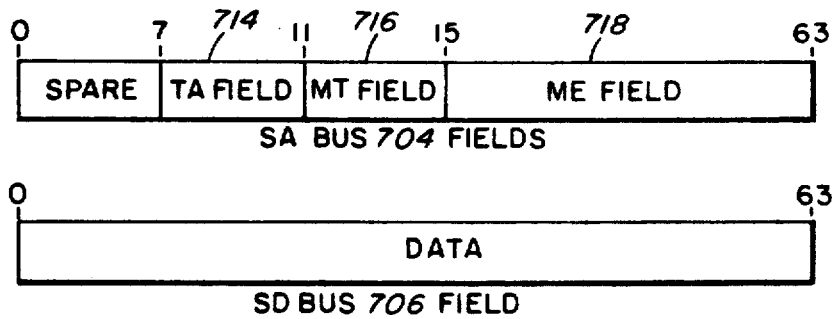
FIG. 7A is a diagrammic representation of internal interprocessor communications transmitted through the internal bus structure of the exemplary system; and, FIG. 8 is a diagrammic representation of an SBI 116.

Referring to FIG. 7A, therein is represented the information which may be presented upon SA Bus 704 and SD Bus 706 in an interprocessor operation. As shown therein, the information appearing on SA Bus 704 includes a 4 bit Target Address (TA) Field 714 identifying the target, or intended recipient of the message, a 4 bit Message Type (MT) Field 716 identifying the type of message to be sent to the target, and a 16 bit Message (ME) Field 718 which may contain a message. In certain interprocessor communication operations, wherein data is to be transmitted from one element to another, SD Bus 706 may contain a data field of up to 8 bytes.

D.2.c. TA Field 714 Codes

Considering now the various interprocessor communication fields appearing on SA Bus 204, the TA Field 714 may, for example, contain the following target identification codes:

| CODE | TARGET IDENTIFIED |
|---|---|
| 0 | Support Control Unit (E.g., LSC 112 or RSC 114); |
| 1 | Broadcast to all CPUs 110; |
| 2 | CPU1 110; |
| 3 | CPU2 110; |
| 4 | CPU3 110; |
| 5 | CPU4 110; |
| 6 | CPU5 110; |
| 7 | CPU6 110; |
| 8 | CPU7 110; |
| 9 | CPU8 110; |
| A | Reserved for future use; |
| B | SBI1 116; |
| C | SBI2 116; |
| D | SBI3 116; |
| E | SBI4 116; and, |

-continued

| CODE | TARGET IDENTIFIED |
|------|-------------------|
| F | Broadcast to all SBIs 116. |

It should be noted that the above codes are presented in hexidecimal format.

It is apparent from the above code formats that the exemplary system envisioned in the above code assignments includes a single Support Control Unit 112 or 114, up to 8 CPUs 110 and up to 4 SBIs 116. The assignment of target codes may be altered at will, depending upon the envisioned configuration of the particular System 102.

It should be noted that SPUs 118 are targeted and messages transmitted thereto through the SPU 118's associated SBIs 116. It should also be noted that the interprocessor communications allow the simultaneous broadcast of messages to all elements of a given type, for example, to all CPUs 110 or to all SBIs 116.

There are no target identification codes for memory elements, that is, for MEMs 108, provided in the exemplary TA Field 714 codes. As described previously, all memory related operations are initiated at the MC Bus 702 code level and the target MEMs 108 identified by addresses concurrently appearing on SA Bus 704.

D.2.d. MT Field 716 Codes

The contents of the MT Fields 716 depend upon the particular type of recipient identified in the associated TA Field 714, that is, in the present example, whether the targeted recipient is an SBI 116, that is, an SPU 118 connected from an SBI 116, a CPU 110 or a Support Control Unit 112 or 114. As will appear in the exemplary MT Field 216 codes presented below, an MT Field 716 code may identify a message as being the transfer of a message, the transfer of data, or a command for an operation or change of operating state on the part of the recipient element.

Considering first examples of the types of MT codes which may be transmitted to an SBI 116 type of element:

| CODE | MESSAGE TYPE |
|------|--------------|
| 0 | Message transfer to target SPU 118; |
| 1 | Data transfer to target SPU 118; |
| 8 | Reset target SBI 116; |
| 9 | Reset target SPU 118; |
| A | Turn Input/Output I/O)) protection off; |
| B | Turn I/O protection on; |
| C | Enable I/O access to specified memory page; and, |
| D | Disable I/O access to specified memory page |

Again, the MT Field 716 codes above are presented in hexidecimal format and codes 2, 3, 4, 5, 6, 7, E and F are reserved for future use.

Considering now examples of the MT Field 716 codes which may be used when the targeted recipient is a CPU 110:

| CODE | MESSAGE TYPE |
|------|--------------|
| 0 | Class 1 I/O Interrupt; |
| 1 | Class 2 I/O Interrupt; |
| 8 | Interprocessor communication; and, |
| 9 | Synchronize clock. |

Again, the codes are presented in hexidecimal format and codes 2 to 7 and A to F have been reserved for future use.

It should be noted that the above CPU 110 message types provide for two classes of I/O interrupt, Class 1 for when no error has appeared in the I/O operation and Class 2 for when an error has occurred in the I/O operation, for example, in the data. The two classes are provided because of the different handling of these events by the targeted CPU 110.

Still other examples of interprocessor messages occupying the ME Field 718 are I/O messages, essentially commands from the CPUs 110 to the SBIs 116 or SPUs 118 to initiate or control the operations of these elements.

Finally, and referring again to FIG. 7, as described above with reference to memory related operations certain single line sub-busses of System Bus 104 are associated with interprocessor communication operations. Among these are Acknowledge (ACK) 720 and Target Busy (TB) 722. ACK 720 is asserted by the target element of an interprocessor communication when that target exists and acknowledges that the sending element is attempting to send an interprocessor communication to that target element. The sending element monitors ACK 720 to determine whether the attempt to send an interprocessor communication was successful.

TB 722 is asserted by the target element of an interprocessor communication to indicate that the target element is busy and cannot accept the interprocessor communication. The sending element monitors TB 722 and, if the TB 722 is asserted by the target element, will handle the condition depending upon the nature and function of the sending element.

Also associated with both interprocessor communications and memory related operations is LOCK 724. LOCK 724 may be asserted by the initiator of a memory related operation or interprocessor communication to lock out all other users of System Bus 104. LOCK 724 may be asserted, for example, when an element wishes to communicate a series of interprocessor communications or a series of memory operations. LOCK 724 is monitored by all elements connected to System Bus 104 and no user will attempt to obtain access to System Bus 104 while another element is asserting LOCK 724.

Finally, as indicated in FIG. 7, System Bus 104 may include a System Clock (SYSCLK) 726, which is provided to all users of System Bus 104, thereby achieving common timing for all such elements.

Having described the structures and operations of both SPU Bus 120 and System 102's internal busses, the interface between these busses, that is, SBI 116, will be described next below.

E. System Bus Interface (SBI) 116 (FIG. 8)

As described above, the I/O structure of System 102 is comprised of one or more I/O bus structures. Each I/O bus structure includes a Satellite Processor Unit (SPU) Bus 120 connected from System Bus 104 through a System Bus Interface Unit (SBI), with one or more Satellite Processor Units (SPUs) 118 connected from each SPU Bus 120. Each SBI 116 therefore operates effectively as the interface between its' associated SPU Bus 120 and System 102's internal bus structure, that is, System Bus 104.

Referring to FIG. 8, therein is presented a block diagram of an SBI 116, with the fundamental elements of an SPU Bus 120, that is, A/D Bus 202 and C/I Bus 204 appearing at the left and the fundamental elements of System Bus 104, that is, MC Bus 702, SA Bus 704 and SD Bus 706 appearing at the right.

Considering first the flow of data and addresses from SPU Bus 120 and to System Bus 104, as shown in FIG. 8 SBI 116 has a Address/Data Output Buffer (ADOB) 802 connected from A/D Bus 202 to receive address and data information therefrom, that is, address and data information from an SPU 118's OR1 530, OR2 532 and OR3 534. The output of ADOB 802 may be either address or data information and the output of ADOB 802 is accordingly connected to the inputs of Address Register Latch (ARL) 804 and System Data Output Register (SDOR) 806. As implied by their designations, ARL 804 is provided to receive and store address information while SDOR 806 is provided to receive and store data.

The address information output of ARL 804 is connected through System Address Output Buffer (SAOB) 808 to System Address (SA) Bus 704 to complete the path through which system address information is provided from SPU Bus 120's A/D Bus 202 to System Bus 104's SA Bus 704. System address information provided therethrough is used by System 102's internal bus mechanism in the manner described above in section D of the present description.

The data output of SDOR 806 is, as shown in FIG. 8, provided to System Data (SD) Bus 706 through bidirectional System Data Buffer (SDB) 810 to complete the path through which data is provided from SPU Bus 120's A/D Bus 202 to System Bus 104's SD Bus 706. It should be noted at this point that the data path of SPU Bus 120, that is, A/D Bus 202, is 32 bits (one word) wide while the data path of System Bus 104, that is, SD Bus 706, is 64 bits (two words) wide. In addition, and as previously described, 64 bit data transfers from an SPU 118 to System 102's internal bus may be executed. For this reason, SDOR 806 is a dual 32 bit wide register, that is, is 64 bits wide and structured as two, parallel 32 bit registers, and each of the 32 bit registers comprising SDOR 806 may be written individually. In a 64 bit write from SPU Bus 120 to System Bus 104, therefore, the two 32 bit words appearing in succession on A/D Bus 202 may therefore be successively written into and held in SDOR 806 to form a single, 64 bit word. The 64 bit word may then be written from SDOR 806 and to SD Bus 706 as a single, 64 bit word. The data provided to SD Bus 706 from A/D Bus 202 through this path is used by System 102's internal bus mechanism in the manner described above in section D of the present description.

Next considering the path through which data is provided from System Bus 104 to the SPU Bus 120, as shown in FIG. 8 SBI 116 is provided with a System Data Input Register (SDIR) 812, which has a data input connected from SD Bus 706 through bidirectional SDB 810. The data output of SDIR 812 is in turn connected to A/D Bus 202 through Data Input Buffer (DIB) 814. Again, the data path provided by SD Bus 706 is 64 bits wide while the data path provided by A/D Bus 202 is 32 bits wide. For this reason, SDIR 812 is structured as dual, 32 bit parallel registers wherein the two registers may be individually read. A 64 bit word appearing from SD Bus 706 may therefore be written from SD Bus 706 and into SDIR 812 in a single write operation, and read from SDIR and to A/D Bus 202 in two successive reads of one 32 bit word each.

Now considering the means by which system address provided from SA Bus 704 to SPU Bus 120, this operation requires an address transformation in that certain system addresses must be transformed into both a TI Field to appear on C/I Bus 204 and/or an accompanying address appearing on A/D Bus 202. As such, the transformation of system addresses into SPU 118 addresses will be described below in association with the passing of control information between an SPU 118 and System 102's internal busses. It should be noted, at this point, that SBI 116 includes a System Address Input Buffer (SAIB) 816 connected from SA Bus 704 to receive system addresses.

From the previous descriptions of the operations of System 102's I/O structure and System 102's internal bus structure it is apparent that there must be a transformation between the command codes (CC Fields) and addresses (TI Fields) of C/I Words used in the I/O structure and the internal bus codes and addresses appearing on MC Bus 702 and SA Bus 704 and used internally to System 102.

Considering first the control path from SPU Bus 120 to System Bus 104, SBI 116 is provided with a Control Input Buffer (CIB) 818 connected from C/I Bus 204 to receive the CC and TI Fields of C/I Words appearing thereon. The output of CIB 818 is in turn connected to the input of Control Input Register (CIR) 820, which receives and stores C/I Words received from CIB 818.

As shown in FIG. 8, an output of CIR 820 is provided to Command/Indentity Decoder (CID) 822, which decodes the TI and CC Fields of C/I Words to provide control outputs directing the operations of SPU Bus 120 and System Bus 104. In particular, CID 822 generates MC Bus 702 codes corresponding to the operation to be performed and provides these codes to MC Bus 702 through MC Output Buffer (MCOB) 824.

Next considering the providing of control information to SPU Bus 120, as previously described the type of operation presently requested by an SPU 118, the system address involved in the operation, and the system address from which an operation is directed may, in certain operations, control the CC and TI Fields of the C/I Word appearing on SPU Bus 120 to control the operation executed by the SPU 118.

As indicated in FIG. 8, the system address output of ARL 804, the decoded command outputs of CID 822 and certain CC and TI Field information from a C/I Word currently latched in CIR 820 are provided as inputs to a Memory Operation Buffer (MOB) 826. MOB 826 receives and stores this information and operates as a pipeline buffer for SPU Bus 120 to/from System Bus 104 operations. In this regard, it should be noted that, as previously described, certain operations may require a variable number of bus cycles to complete. In part, MOB 826 operates as a pipeline to store such operations and thereby to free SPU Bus 120 and System Bus 104 for other operations while such delayed operations are awaiting completion.

As shown in FIG. 8, the information stored in MOB 826 is provided as inputs to Interprocessor Command Generator (IPC CG) 828 and Identity Multiplexer (IM) 830. In association, the system address output of SAIB 816 is provided as inputs to Memory Operation Command Generator (MO CG) 832 and IM 830.

IPC CG 828 and MO CG 832 operate in association to generate CC Fields of C/I Words to be provided to C/I Bus 204 to control the operations of the SPU 118s connected therefrom in the manner previously described. In this regard, IPC CG 828 utilizes the information provided from MOB 826, that is, information pertaining to an operation specified by an SPU 118, with associated target identification and system address, if pertinent, to generate C/I Word CC Fields for SPU 118 initiated operations. MO CG 832 performs an analogous function with respect to operations initiated by System 102 internal elements, that is, operations initiated from System Bus 104 by an element connected therefrom.

As shown in FIG. 8, the outputs of IPC CG 828 and MO CG 832 are provided to Command Register (CR) 834, which stores CC Fields to be subsequently provided to CC Bus 208 through Command Output Buffer (COB) 836.

IM 830 operates in parallel with IPC CG 828 and MO CG 832 to generated the TI Fields of C/I Words to be provided to C/I Bus 204. In this respect, IM 830 is provided with target identification of type of operation information from MOB 826 and system address information from SAIB 824. The TI Field output of IM 830 is provided to TI Bus 206 through Identity Register (IR) 838 and Identity Output Buffer (IOB) 840.

Finally, it is apparent from the previously described operation of SPU Bus 120 and System Bus 104 that it is preferable that each of these busses be able to operate independently, that is, asynchronously, with respect to SBI 116. For this reason, those elements of SBI 116 which interface with System Bus 104 and those elements of SBI 116 which interface with SPU Bus 120 are provided with separate control logic elements. These elements are identified in FIG. 8 as, System Bus Response Logic (SBRL) 842 and SPU Bus Response Logic (SPUBRL) 844. As indicated therein, SBRL 842 is provided with control inputs from SAIB 816, that is, from SA Bus 704, and from MC Bus Input Buffer (MCIB) 846, which is connected from MC Bus 702. SPUBRL 844 is provided with control inputs from CIB 818, that is, from CC Bus 208 and TI Bus 206. The detailed design and operation of SBRL 842 and SPUBRL 844 will be well understood by those of ordinary skill in the art, and will not be discussed in further detail herein.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

APPENDIX

DEVICE DATA 15-00 (DD15-DD0)

These lines form a 16 bit bidirectional data bus through which the DA is able to transmit and receive data, status, and commands to either the IOC's 8086, local RAM or I/O bus arbitration control logic. When there is no DMA in progress the bus is directed by the 8086's DT/R output and the DA must not drive this bus other than during DMA write operations or when delivering requested data (such as status, etc). The bits are labeled DD15-DD0 with DD15 being the most significant bit.

BUFFERED 8086 ADDRESS BITS 15-00 (BA15-BA00)

This 16 bit, unidirectional bus is supplied by the 8086 microprocessor and is used to issue various commands and requests to the DA.

BUFFERED BUS HIGH ENABLE ($\overline{BBHE}$)

This signal is simply BHE (pin 34) of the 8086 buffered. For a detailed explanation refer to the Intel 8086 User's Manual.

DEVICE ADAPTER OPERATION ($\overline{DAOP}$)

This signal is generated by the IOC to indicate that the current 8086 operation is directed at the device adapter. This line decodes the IOC's 8086 address and is active for all I/O addresses from 0080H to FFFFH.

BUFFERED DATA TRANSMIT/RECEIVE (BDT/$\overline{R}$)

This signal is simply DT/$\overline{R}$ (pin 27) of the 8086 buffered. For a detailed explanation refer to the Intel 8086 User's Manual.

I/O WRITE ($\overline{IOWR}$)

This signal is simply WR (pin 29) of the 8086 buffered. It is necessary to allow the DA to qualify the IOC's output data during IOC to DA commands. For a detailed explanation refer to the Intel 8086 User's Manual.

I/O READ ($\overline{IORD}$)

This signal is simply RD (pin 32) of the 8086 buffered. It is necessary to allow the DA to qualify the IOC's input data during a data transfer from the DA to the IOC. For a detailed explanation refer to the Intel 8086 User's Manual.

HOLD READY ($\overline{HRDY}$)

This signal provides the DA with the means to stop the 8086 while the DA is performing a Non-DMA 8086 Requested Operation. This signal should only be generated when absolutely necessary, since it will cause a Degeneration in I/O Performance. The Device Adapter should be designed to perform most 8086 related operations without the use of HRDY.

8086 PROCESSOR CLOCK ($\overline{PCLK}$)

This clock is generated by the IOC section's hardware and may be needed to synchronize the IOC's 8086 Interface Signals. The period of this clock is 125 ns., with a 66.6% duty cycle (assuming the IOC's oscillator is 24 MHZ).

DEVICE ADAPTER CLOCK ($\overline{DACLK}$)

This clock is provided by the IOC and should be used to synchronize all DMA Strobes, such as DR, DW, LD, and UNLD. The period of this clock is dependent on the VS 300 I/O bus clock which is controller by the SBI. Its frequency and duty cycle are specified in the SBI Hardware Specification.

DEVICE ADAPTER INITIALIZE ($\overline{DAINIT}$)

This signal is generated by the IOC and is a function of either the VS 300 I/O bus signal line "Init" (which is a power-on reset) or the VS 300 I/O bus I/O Initialize command (which is a programmable I/O reset) or the IOC's DAINIT I/O command port (0068H).

DEVICE ADAPTER READ (DR)

This signal must be generated by the DA in the case of a DMA Read from System Memory or Local RAM (write to peripheral). When the DA is prepared to request DMA data from the I/O Arbitration control logic, the DR must be set by the DA logic. This signal must remain active (set) until the last data half word has been read and the Completion Interrupt is set by the DA.

INPUT BUFFER READY (IBR)

The IBR signal is generated by the I/O arbitration control DMA logic and is used to control the flow of data from the arbitration input ports (IR1, IR2) to the DA. IBR is only a valid signal while the DA has raised the "DR" line. IBR, if set, indicates to the DA logic that the I/O bus IR1 and IR2 ports have valid data ready. When IBR is reset or zero IR1 and IR2 ports are not ready. In the case of a DMA to system memory the IBR signal is coupled with the signal "UNLD" to from a handshake protocol between the DA and the I/O bus arbitration control logic. After the IBR is set by the arbitration logic, the DA reads the data out by issuing a series of "UNLD" pulses. The IBR is lowered by the arbitration DMA control logic automatically after the appropriate number of UNLD pulses (determined by the 32/64 BSR bit-32=two UNLD pulses, 64=four UNLD pulses). This process is repeated until the DMA transfer is complete. Should the DMA transfer terminate such that only IR1 is loaded from system memory and the BSR calls for every transfer to contain 64 bits (BSR bit 12=0), the IBR line will never become set. The data will be in IR1 and the DA will not be aware of its presents.

IBR is not used to regulate transfers from the Local RAM memory. Instead, the DA must gate the UNLD pulse with a Divide by two square wave of DACLK (I/O bus clock). This means that the DA will not be able to access or read the Local RAM sooner than one full period of the I/O bus clock which will guarantee the LR's address set-up time is met.

UNLOAD ($\overline{UNLD}$)

This data strobe is used to Read the I/O's input buffers and increment the address counter (OR1) in the arbitration DMA logic. It is the responsibility of the DA to inhibit UNLD whenever IBR is LOW and during non-DMA DA operations. Failure to do this will cause OR1 to be incremented erroneously.

DEVICE ADAPTER WRITE (DW)

This signal must be generated by the DA in the case of a DMA Write to System Memory or Local RAM (that is, read the peripheral data). The DW signal is set by the DA at the beginning of the DMA operation and must remain set for the entire DMA transfer. DW should not be lowered until after the last data transmission is received and the Completion Interrupt is issued to the IOC. On the last DMA transfer, if the DW is lowered before the OBR signal becomes a high indicating the last word is transfered, the wrong OR1 address can be issued to system memory.

OUTPUT BUFFER READY (OBR)

The OBR signal is generated by the I/O arbitration control DMA logic and serves to regulate the flow of data from the DA to the arbitration logic's output ports (OR2, OR3). This line if set indicates to the DA logic that the I/O bus's OR2/OR3 are empty and ready to be loaded with DMA data. If OBR is a logic low, the I/O bus Output registers are full. The OBR signal is coupled with the "LD" signal issued by the DA to form a handshake protocol. When performing a DMA, if OBR is set, the DA begins issuing LD pulses loading the output data. Depending on the BSR 32/64 bit, the I/O DMA control logic lowers the OBR line when the output registers are full (if 32 bit transfer then there are two LD pulses, if 64 bit transfer then there are four LD pulses), causing the DA to stop issuing LD pulses. The OBR remains low until the I/O bus arbitration logic issues the system address and data to system memory. The I/O bus arbitration logic automatically increments the OR1 address. This process continues until the transfer is complete. Should a DMA transfer end with out supplying enough LD pulses to lower OBR or fill the output registers, then that partical word(s) transfer will remain in the I/O's output registers.

OBR is not used to regulate transfers to the Local RAM memory. Instead, the DA must gate the LD pulse with a Divide by two square wave of DACLK (I/O bus clock). This means that the DA will not be able to access or read the Local RAM sooner than one full period of the I/O bus clock which will guarantee the LR's address set-up time is met.

LOAD ($\overline{LD}$)

This data strobe is generated by the DA loading DMA data into the I/O's output registers and causing the OR1 to increment. Whenever the OBR signal is low, the DA must inhibit the activation of the LD line.

SET System Bus Error A ($\overline{SSBEA}$)

This signal is generated by the I/O bus arbitration logic when the DA has encountered a system bus error while performing a DMA operation. Reception of this signal from the SBI results in the setting of a DA status error bit, the latching of IR1 with the SBI error status word and the termination of the current DMA and the issuing of some kind of completion interrupt to the IOC.

SET SYSTEM BUS ERROE B ($\overline{SSBEB}$)

This signal is generated by the I/O bus arbitration logic when the DA has encountered a system bus error while performing a DMA operation. Reception of this signal from the SBI results in the setting of a DA status error bit, the latching of IR1 with the SBI error status word and the termination of the current DMA and the issuing of some kind of completion interrupt to the IOC.

OR1-SYSTEM MEMORY ADDRESS BIT 10 ($\overline{MA10}$)

This signal is supplied by the I/O bus arbitration control logic and is monitored by the DA, detecting 2K byte Page Crossing during DMA operations. A Low to High transition of the MA10 signal during a DMA signifies the crossing of a 2K byte system memory page. MA10 is taken directly from the system memory address counter. The counter is incremented with the rising edge of either "LD" or "UNLD". This means the counter points to the next address while the current DMA transfer is being issued by the I/O. For this reason the DA must qualify the interpretation of MA10 during DMA's with the fact that the I/O bus arbitration logic has completed the last transfer and is attempting to execute the 2K plus one byte transfer to system memory. If only MA10 is sampled by the DA, then a 2K byte page crossing will be detected on the 2K byte transfer to system memory.

COMPLETION INTERRUPT ($\overline{CI}$)

This signal is issued by the DA to inform the IOC that a device adapter task has completed. The lowering of the signal CI need not be synchronous with the IOC's 8086 clock but should have a duration of no less than 125 ns. An interrupt is generated on the low to high transition of the CI strobe. This signal must be inhibited when not in DMA mode or erroneous IOC interrupts can result.

SPARE INTERRUPT ($\overline{SI}$)

This Interrupt is provided for Device Adapters that may require an interrupt other than CI. For example, the Magnetic Tape DA will probably need a means of interrupting the IOC's 8086 when encountering a system memory Page Break. This signal must be inhibited while not in DMA mode and on DA's that do not require it, the line must be pulled "High".

DISABLE TERMINATION OR DISABLE PAGE BREAK

The I/O arbitration DMA logic prefetch mechanism terminates on a 2K byte page crossing and unless a new OR1 address is loaded by the IOC, anymore DA data transfers to system memory will be inhibited. The DT line (a page break inhibit signal) when held low will allow the DMA to continue into the next system memory page area. The DT line must remain low for the entire duration of the DA's DMA operation. This feature is used in the disk ECC diagnostics and by the Kennedy Tape controller to perform larger than 2K byte DMA's without IOC intervention.

DEVICE ADAPTER DMA OPERATION SEQUENCE

Once the DA is prompted by IOC commands (IN and OUT instructions) to perform a DMA operation, the DA sets either the DR or DW signal, placing the I/O arbitration control logic into DMA mode. Next the DA samples the IBR and OBR signals to determine if either data is present in the I/O's input registers or the I/O's output registers are ready to accept DA data. The DA issues the UNLD or LD pulses to the I/O arbitration logic reading or writing the I/O's input/output registers. The incrementing of the system memory/local RAM address counter is handled by the I/O bus arbitration control logic. The I/O's input and output registers are loaded and transfered in either single word (32 bits) or double word (64 bits) boundaries as determined by the BSR's 32/64 bit. The source/destination for the DA DMA is specified by the BSR's LR/MM bit. Upon initiation the various ports within the IOC are switched according to the status bits 32/64 and LR/MM. For writes to system memory the transition of OBR to the ready state on the last transfer indicating that the write is complete must be tested prior to terminating DMA.

WRITE TO DEVICE ADAPTER

1) The IOC must set-up BSR and transfer required control information to DA via In/Out commands.
2) The DA sets DR.
3) The DA activates $\overline{UNLD}$ when IBR becomes a one.
4) The DA continues step (3) until the data in the transfer is exhausted.
5) DA resets DR and generates $\overline{CI}$.

READ FROM DEVICE ADAPTER

1) The IOC sets-up the BSR and transfers the required control information via In/Out commands.
2) The DA sets DW.
3) The DA activates $\overline{LD}$ when OBR becomes a one.
4) The DA continues step (3) until DMA data count is exhausted.
5) The DA waits for the last IBR to go high.
6) The DA resets DW and generates CI.

VS 300 I/O Bus Description

INTRODUCTION

The VS 300 I/O bus structure was developed to improve the VS peripheral controller's data transfer rate to system memory, thus augmenting the overall VS system performance. The I/O bus provides a maximum transfer rate of 33 MegaBytes/second exceeding that of the VS 300 system memory bus. The system memory transfer rate or bandwidth for double word (64 bit) reads and writes is approximately 16 and 26 MegaBytes/second respectively. However, the present VS 300 I/O controller I/O bus protocols only permit the controllers to attain approximately 24 out of the possible 33 MegaByte's of I/O bus bandwidth due to the transmission of a system memory address with each I/O double word data transfer. Still, the VS 300 I/O bus provides a fast enough transfer rate to effectively utilize the system memory available bandwidth. The VS 300 I/O bus transfer rate is a considerable improvement over that attained by the present VS 100 product and will serve to help eliminate any I/O bus bottlenecks.

The VS 300 I/O bus supports the interfacing of up to 15 I/O controllers across a 32 bit address/data multiplexed bi-directional bus. The I/O bus provides nine separate Bus Control Signals which consist of 4 device address lines and 5 I/O bus command lines which specify the I/O bus operation. The I/O bus is synchronous and all bus transactions occur on the rising edge of a free running clock provided by the System Bus Interface unit. The frequency of the I/O bus clock is determined by the SBI and is synchronous to the system bus's 60 nanosecond free running clock. The fastest clock frequency permitted on the VS 300 I/O bus is 120 nanoseconds or 8.333 Mhz. All of the 32 possible I/O bus command operations require one, two or three consecutive I/O bus clock cycles to be executed at which time the device on the bus releases control. The I/O bus provides a line called "HOLD" which is used by each of the devices to secure the bus for more than one cycle I/O bus operations. Normally this signal is never on for more than 2 bus clock cycles (such as in the case of a 3 cycle bus operation) but it is possible for any device to hog the bus by asserting "HOLD" and leaving it active indefinitely. This must not be done on the current VS 300 I/O bus for several of the I/O devices perform time dependent system memory DMA transfers and any device that hogs the bus would result in an I/O device under or over-run errors.

Each of the possible 15 I/O bus devices is assigned a priority determined by the device's physical position on the parent plane. The I/O bus provides 4 additional lines which are hardwired to either zeros or ones to reflect the address of each possible parent plane slot starting at (0000) and ending with (1111). The SBI resides in slot (0000) and is assigned the highest bus priority and the bus priority decends as the I/O slots increase with (1111) being the lowest priority. The I/O bus priority mechanism is simular to that of a daisey chain where the highest priority passes a priority enable to the next lower device who inturn passes the priority enable to the next and so on. Except the priority chain consists of up to ten signal lines run in a parallel fashion to the different controllers. This technique permits any device in the priority chain to be removed or to be absent without effecting the priority chain and the propogation delay down the chain is less than that of a single priority line.

| | | I/O BUS SIGNAL PIN-OUT AND FUNCTION | |
|---|---|---|---|
| SIGNAL | PIN | ACTIVE POLARITY | FUNCTION |
| IPCRDY(n) | A-11 | LOW | Generated by the I/O indicating to the SBI the current state of the I/O's IPC Register. If IPCRDY is low the I/O's IPCR is or is about to become not ready. This line permits the SBI to detect the state of a targetted I/O's IPCR during a System Bus IPC operation preventing unnecessarily long SBI busy conditions. There is a separate IPCRDY line per I/O or 15 in all. |
| IODB00 | A-30 | LOW | Bi-directional address/data bit (MSB). |
| IODB01 | A-31 | LOW | Bi-directional address/data bit. |
| IODB02 | A-34 | LOW | Bi-directional address/data bit. |
| IODB03 | A-35 | LOW | Bi-directional address/data bit. |
| IODB04 | A-38 | LOW | Bi-directional address/data bit. |
| IODB05 | A-39 | LOW | Bi-directional address/data bit. |
| IODB06 | A-42 | LOW | Bi-directional address/data bit. |
| IODB07 | A-43 | LOW | Bi-directional address/data bit. |
| IODB08 | A-46 | LOW | Bi-directional address/data bit. |
| IODB09 | A-47 | LOW | Bi-directional address/data bit. |
| IODB10 | A-50 | LOW | Bi-directional address/data bit. |
| IODB11 | A-51 | LOW | Bi-directional address/data bit. |
| IODB12 | A-54 | LOW | Bi-directional address/data bit. |
| IODB13 | A-55 | LOW | Bi-directional address/data bit. |
| IODB14 | A-58 | LOW | Bi-directional address/data bit. |
| IODB15 | A-59 | LOW | Bi-directional address/data bit. |
| IODB16 | A-62 | LOW | Bi-directional address/data bit. |
| IODB17 | A-63 | LOW | Bi-directional address/data bit. |
| IODB18 | A-66 | LOW | Bi-directional address/data bit. |
| IODB19 | A-67 | LOW | Bi-directional address/data bit. |
| IODB20 | A-70 | LOW | Bi-directional address/data bit. |
| IODB21 | A-71 | LOW | Bi-directional address/data bit. |
| IODB22 | A-74 | LOW | Bi-directional address/data bit. |
| IODB23 | A-75 | LOW | Bi-directional address/data bit. |
| IODB24 | A-78 | LOW | Bi-directional address/data bit. |
| IODB25 | A-79 | LOW | Bi-directional address/data bit. |
| IODB26 | A-82 | LOW | Bi-directional address/data bit. |
| IODB27 | A-83 | LOW | Bi-directional address/data bit. |
| IODB28 | A-86 | LOW | Bi-directional address/data bit. |
| IODB29 | A-87 | LOW | Bi-directional address/data bit. |
| IODB30 | A-90 | LOW | Bi-directional address/data bit. |
| IODB31 | A-91 | LOW | Bi-directional address/data bit (LSB). |
| ID0 | C-05 | LOW | Bi-directional I/O identification bit used to indicate the I/O's slot position on the bus (MSB). |
| ID1 | C-06 | LOW | Bi-directional I/O identification bit used to indicate the I/O's slot position on the bus. |
| ID2 | C-07 | LOW | Bi-directional I/O identification bit used to indicate the I/O's slot position on the bus. |
| ID3 | C-10 | LOW | Bi-directional I/O identification bit used to indicate the I/O's slot position on the bus (LSB). |
| ID4 | C-11 | LOW | Bi-directional signal used to specify I/O bus commands. In the previously developed VS 200 |
| SELINIT | C-14 | LOW | Generated by the SBI and causes the I/O's to reset. The SBI asserts this signal when it detects a "Reset Target SPU" command on the system bus. |
| BCK0 | C-15 | | Generated by the SBI and serves as the I/O's master clock. All I/O's use this clock to synchronize I/O bus operations. The bus clock has a 50% duty cycle with a period of 120 nanoseconds. |
| C0 | C-23 | LOW | Bi-directional signal used to specify the I/O bus commands. |
| C1 | C-26 | LOW | Bi-directional signal used to specify the I/O bus commands. |
| C2 | C-27 | LOW | Bi-directional signal used to specify |

-continued

I/O BUS SIGNAL PIN-OUT AND FUNCTION

| SIGNAL | PIN | ACTIVE POLARITY | FUNCTION |
|---|---|---|---|
| C3 | C-30 | LOW | the I/O bus commands. Bi-directional signal used to specify the I/O bus commands. |
| HOLD | C-31 | LOW | Bi-directional signal used to extend the number of clock cycles a device has control of the I/O bus. Assertion of the HOLD line by a device prevents any other device from gaining access to the I/O bus. This signal should not remain active for longer than two I/O Clock cycles. |
| IOACK | C-34 | LOW | Bi-directional signals active during |
| IOBUSY | C-38 | LOW | I/O bus SB IPC and IPC operations. In the case of an IPC operation, these lines indicate whether the I/O bus operation successfully loaded a target I/O's IPC register. In the case of an SB IPC operation these lines indicate whether the SBI successfully performed the system bus operation requested by the I/O bus command. The interpretation of IOACK and IOBUSY are as follows:<br>IOACK  IOBUSY<br>1  1  No Response<br>1  0  Illegal case<br>0  1  IPC command Accept<br>0  0  IPC command Rejected |
| TIMER | C-35 | | Free-running clock generated by the SBI used to increment the IOC's Interval Timer. The clock granularity is 12.5 useconds. |
| SBIBUSY | C-39 | LOW | Generated by the SBI indicating that the SBI can not accept I/O bus commands. This signal is used by the I/O's arbitration logic to inhibit bus access while SBIBUSY is active. |
| IOREQ | C-42 | LOW | Generated by the I/O's indicating that one or more I/O controllers has an Interrupt pending. The SBI passes this line along to the system CPU for processing. When the VS 300 system switches to IPC message task completion this signal will not be necessary. |
| GRO | C-55<br>C-54 | LOW | The Group enable signal is generated by the SBI or one of the first seven I/O controllers and used as an input signal to I/O's eight through fifteen. Assertion of this signal inhibits the I/O's arbitration logic from gaining access to the I/O bus. |
| HRQ(n) | C-69<br>C-56, 58<br>C-60, 62<br>C-64, 66<br>C-68 | LOW | The High order ReQuest signals are generated by I/O's one thru seven and are also inputs to I/O's two thru seven. These lines comprise the I/O bus priority mechanism and when asserted inhibit I/O's bus access. |
| LRQ(n) | C-69<br>C-56, 58<br>C-60, 62<br>C-64, 66<br>C-68 | LOW | the Low order ReQuest signals are generated by I/O's eight thru fifteen and are also inputs to I/O's nine thru fifteen. These lines comprise the I/O priority mechanism and when asserted inhibit I/O's bus access. |
| IOINIT | C-71 | LOW | Generated by the VS 300 power supply or panel switch closure. Passed through and re-driven by the SBI, this signal serves as the VS 300 master power on reset. This signal is bused to each of the I/O controllers. |
| PWRF | C-84 | LOW | Generated by the VS 300 system power supply indicating the system power source is insufficient or non existant. The PoWeR Fail signal signifies the VS 300 system is being powered by battery back-up. |
| −12 V | C-91, 92 | | Minus twelve volt power source. |

What is claimed is:

1. An I/O subsystem component for coupling a peripheral device to an I/O subsystem of a digital data processing system, the I/O subsystem including one or more I/O subsystem components and a synchronous I/O subsystem bus for carrying I/O communications, which require one or more I/O subsystem bus cycles, and which include I/O subsystem communications that have I/O subsystem components as destinations and I/O system communications that have components of the digital data processing system outside of the I/O subsystem as destinations, the I/O subsystem component comprising:

control means for controlling the I/O subsystem component to originate and provide I/O communications, and responding to an incoming message;

device adapter means coupled to the peripheral device and controlled by the control means for transferring outgoing data from the peripheral device for inclusion in certain of the I/O communications and transferring incoming data intended for the peripheral device to the peripheral device; and interface means coupled to the I/O subsystem bus, to the control means, and to the device adapter means for responding to the control means when the I/O subsystem component is providing an I/O communication to the I/O subsystem bus by receiving I/O communication information for the I/O communication from at least one of the control means and the device adapter means and outputting the I/O communication to the I/O subsystem bus as required for the I/O communication and responding to the I/O subsystem bus by monitoring I/O communications on the I/O subsystem bus and responding thereto only when the I/O communication is one of the I/O subsystem communications and has the I/O subsystem component as its destination by receiving the I/O communication and providing any incoming message to the control means and any incoming data intended for the device adapter means to the device adapter means.

2. The I/O subsystem component as set forth in claim 1 and wherein:

the I/O subsystem bus includes a first plurality of lines for carrying an I/O command belonging to the I/O communication during all of the I/O subsystem bus cycles required for the I/O communication;

a second plurality of lines for carrying a target identification which belongs to the I/O communication and which identifies an I/O subsystem component involved in the I/O communication during all of the I/O subsystem bus cycles required for the I/O communication; and a third plurality of lines which carries other information belonging to the I/O communication; and when the I/O subsystem component is providing an I/O communication to the I/O subsystem bus, the control means provides the I/O command and the target identification to the interface means, and the interface means outputs the I/O command to the first plurality of lines and the target identification to the second plurality of lines for all of the I/O subsystem bus cycles required for the I/O communication and outputs the other I/O information as required for the I/O communication to the third plurality of lines; and when the I/O subsystem component is responding to an I/O communication, the interface means responds to an I/O command belonging to one of the I/O subsystem communications on the first plurality of lines and a target identification specifying the I/O subsystem component on the second plurality of lines by receiving the other information on the third plurality of lines.

3. The I/O subsystem component set forth in claim 1 wherein:

certain of the I/O system communications and certain of the I/O subsystem communications each includes a message; and when the control means controls the I/O subsystem component to originate and provide one of the certain I/O system communications or the certain I/O subsystem communications, the control means provides a message for inclusion in the provided communication.

4. The I/O subsystem component as set forth in claim 1 and wherein:

the digital data processing system includes memory means which are indirectly coupled to the I/O subsystem bus;

the I/O system communications include an I/O memory write communication which specifies an operation in which data is written from the I/O subsystem component to the memory means and which includes the data to be written and the I/O subsystem communications include an I/O subsystem data return communication which specifies an operation in which data is provided to the I/O subsystem component and which includes the data to be provided;

the control means includes means for specifying a direct memory access operation; and when the direct memory access operation has been specified and the I/O subsystem component is providing the I/O memory write communication, the device adapter means provides outgoing data to the interface means and when the direct memory access operation has been specified and the I/O subsystem component is responding to the I/O subsystem data return communication, the device adapter means takes incoming data from the interface means.

5. The I/O subsystem component as set forth in claim 4 and wherein:

the I/O memory write communication further includes a memory address of the data to be written;

the interface means includes memory address incrementing means and when the direct memory access operation has been specified, the control means provides a start address for a first one of a sequence of I/O memory write communications and the interface means employs the address incrementing means to provide memory addresses for the remaining I/O memory write communications in the sequence.

6. An I/O subsystem system component of a digital data processing system for transferring data to or from one or more peripheral devices in the digital data processing system, the I/O subsystem system component and other system components being coupled to a system bus which transfers system communications among the I/O subsystem system component and the other system components, the I/O subsystem system component comprising:

a synchronous I/O subsystem bus for transferring a plurality of I/O communications which require one or more I/O subsystem bus cycles, the I/O communications including I/O system communications which have system components as their destinations and I/O subsystem communications which have I/O subsystem components within the I/O subsystem system component as their destinations, the I/O subsystem bus comprising

- a first plurality of lines for carrying an I/O command portion of one of the I/O communications, the I/O command portion specifying the one I/O communication during all of the I/O subsystem bus cycles required to transfer the one I/O communication,
- a second plurality of lines for carrying, during all of the I/O subsystem bus cycles required to transfer the one I/O communication, a target identification portion of the one I/O communication, the target identification identifying the I/O subsystem component which is the source of the one I/O communication when the one I/O communication is an I/O system communication and identifying the I/O subsystem component which is the destination of the one I/O communication when the one I/O communication is an I/O subsystem communication, and
- a third plurality of lines which carries an other information portion of the one I/O communication;

one or more I/O subsystem components, each I/O subsystem component being coupled between a given one of the peripheral devices and the I/O subsystem bus for originating I/O communications and providing the I/O communications to the I/O subsystem bus (at least some of these I/O communications including data from the peripheral device) and for responding only to I/O subsystem communications (at least some of these I/O communications including data to the peripheral device); and system bus interface means which are coupled between the system bus and the I/O subsystem bus for responding to an I/O system communication, on the I/O subsystem bus, by providing a corresponding system communication on the system bus and for responding to a system communication, on the system bus, specifying an operation to be performed in the I/O subsystem system component by providing a corresponding I/O subsystem communication on the I/O subsystem bus.

7. In a digital data processing system wherein system components are connected to a system bus which carries system communications including system interprocessor communications and includes a busy line for carrying a busy signal which indicates to a system component which is a source of a system communication that the system communication cannot presently be sent, the system components include an I/O subsystem system component including an I/O subsystem bus which carries I/O subsystem communications including I/O subsystem interprocessor communications and which has an IPC not ready line for carrying an IPC not ready signal and a system bus interface connected between the I/O subsystem bus and the system bus which converts system interprocessor communications destined for an I/O subsystem component of the I/O subsystem system component into corresponding I/O subsystem interprocessor communications and I/O subsystem communications destined for other system components into corresponding system communications, an I/O subsystem component (for coupling a peripheral device to the I/O subsystem bus) comprising:

control means for controlling the I/O subsystem component to originate and provide I/O subsystem communications to the I/O subsystem bus and for responding to incoming messages received in I/O subsystem interprocessor communications and interface means coupled to the I/O subsystem bus, to the control means, and to the peripheral device for responding to the control means when the I/O subsystem component is providing an I/O subsystem communication to the I/O subsystem bus by receiving I/O subsystem communication information for the I/O subsystem communication and outputting the I/O subsystem communication to the I/O subsystem bus, for responding to the I/O subsystem bus by monitoring I/O subsystem communications on the I/O subsystem bus and responding to an I/O subsystem communication that has the I/O subsystem component as its destination by receiving the I/O subsystem communication and providing any incoming message to the control means and any incoming data intended for the peripheral device to the peripheral device, and for responding to the control means when the I/O subsystem component is unable to respond to a system interprocessor communication destined for the I/O subsystem component by providing the IPC not ready signal to the IPC not ready line, the system bus interface responding to the IPC not ready signal and to a system interprocessor communication destined for the I/O subsystem component by not converting the system interprocessor communication to a corresponding I/O subsystem interprocessor communication and by outputting the busy signal on the busy line, whereby the system bus immediately becomes available for any system communication other than a system interprocessor communication destined for the I/O subsystem component.

8. The I/O subsystem component set forth in claim 7 wherein:

the I/O subsystem component is one of a plurality thereof coupled to the I/O subsystem bus, and the I/O subsystem bus includes a separate IPC not ready line for each I/O subsystem component coupled to the I/O subsystem bus;

an I/O subsystem component of the plurality is further a source of certain I/O subsystem interprocessor communications; and the interface means of an I/O subsystem component of the plurality whose IPC not ready line is carrying the IPC not ready signal and which is not currently a source of an I/O subsystem interprocessor communication remains responsive to an I/O subsystem interprocessor communication whose source is not a system component.

9. An I/O subsystem system component of a digital data processing system for transferring data to or from one or more peripheral devices in the digital data processing system, the I/O subsystem system component and other system components being coupled to a system bus which transfers system communications among the I/O subsystem system component and the other system components, the I/O subsystem system component comprising:

a synchronous I/O subsystem bus for transferring a plurality of I/O communications which require one or more I/O subsystem bus cycles, the I/O communications including I/O system communications which have system components as their destinations and I/O subsystem communications which have I/O subsystem components within the I/O subsystem system component as their destinations, one or more I/O subsystem components, each I/O subsystem component being coupled between a given one of the peripheral devices and the I/O subsystem bus for originating I/O communications and providing the I/O communications to the I/O subsystem bus (at least some of these I/O communications including data from the peripheral device) and for responding only to I/O subsystem communications (at least some of these I/O communications including data from the peripheral device); and system bus interface means which are coupled between the system bus and the I/O subsystem bus for responding to an I/O system communication, on the I/O subsystem bus, by providing a corresponding system communication on the system bus and for responding to a system communication, on the system bus, specifying an operation to be performed in the I/O subsystem system component by providing a corresponding I/O subsystem communication on the I/O subsystem bus and wherein at least one of the system components is a memory means;

the system communications include a system memory read communication which specifies an operation in which data read from the memory means is returned to the system component which is the source of the memory read communication and a system memory write communication which specifies data and an operation in which the data provided by the system component which is the source of the system memory write communication is written to the memory means;

a system component can perform a lock operation in which system components other than a system component presently having access to the system bus are inhibited from having access thereto and an unlock operation in which other system components are given access to the system bus;

the I/O system communications include a memory test and set communication specifying an operation in which an I/O subsystem component specifies data in the memory means which is to be read and modified;

the I/O subsystem communications include an I/O subsystem data return communication which specifies data and an operation in which the data is returned to an I/O subsystem component; and the system bus interface means responds to an I/O memory test and set communication by performing the lock operation, producing a system memory read communication on the system bus, then, upon receipt of data from the memory means, producing an I/O subsystem data return communication which includes the received data on the I/O subsystem bus, modifying the received data, producing a system memory write communication which includes the modified data, and performing the unlock operation.

10. Interface apparatus for interfacing an I/O subsystem component of an I/O subsystem system component of a digital data processing system to an I/O subsystem bus, the I/O subsystem system component including at least one I/O subsystem component and the digital data processing system including memory means and other system components which are coupled indirectly to the I/O subsystem bus, the I/O subsystem component being connected to a peripheral device for performing operations as required to transfer data to or from the peripheral device, the operations being specified on the I/O subsystem bus by a plurality of I/O communications which require one or more I/O subsystem bus cycles and which include an I/O memory write communication specifying an operation in which data is transferred from the I/O subsystem component to the memory means, an I/O subsystem message communication specifying an operation in which a message is transferred to an I/O subsystem component, and an I/O subsystem data return communication specifying an operation in which data is returned to an I/O subsystem component, and the I/O subsystem bus including a first plurality of lines for carrying an I/O command specifying one of the I/O communications during all of the I/O subsystem bus cycles required to transfer the specified communication, a second plurality of lines for carrying a target identification identifying an I/O subsystem component involved in the specified communication during all of the I/O subsystem bus cycles required to transfer the specified communication, and a third plurality of lines which carries a memory address during a first I/O subsystem bus cycle and data during a second I/O subsystem bus cycle of the I/O memory write communication, which carries the message during transfer of the I/O subsystem message communication, and which carries data during transfer of the I/O subsystem data return communication, the interface apparatus comprising:

I/O command output means coupled to the first plurality of lines for outputting the I/O command of an I/O communication to the first plurality of lines during all of the I/O subsystem bus cycles required by the I/O subsystem component originating the I/O communication to output the I/O communication;

first output means coupled to the second plurality of lines for outputting an identification of an I/O subsystem component involved in the I/O communication during all I/O subsystem bus cycles required by the I/O subsystem component originating the I/O communication to output the I/O communication;

second output means coupled to the third plurality of lines for outputting a memory address to the third plurality of lines during the first I/O subsystem bus cycle of the memory write communication;

third output means coupled to the third plurality of lines for outputting data to the third plurality of lines during the second I/O subsystem bus cycle of the memory write communication;

target identification receiving means coupled to the second plurality of lines for receiving the target identification of an I/O communication on the I/O subsystem bus and determining whether the received target identification matches an identification of the I/O subsystem component;

I/O command receiving and decoding means coupled to the first plurality of lines for responding to a match detected by the target identification receiving means by receiving and decoding the I/O command of the I/O communication on the first plurality of lines;

message receiving means coupled to the third plurality of lines and responsive to the I/O command decoding means for receiving the message on the third plurality of lines when the target identification and the I/O command indicate that the I/O communication is an I/O subsystem message communication intended for the I/O subsystem component; and data receiving means coupled to the third plurality of lines and responsive to the I/O command decoding means for receiving data on the third plurality of lines when the target identification and the I/O command indicate that the I/O communication is in I/O subsystem data return communication intended for the I/O subsystem component.

11. The interface apparatus as set forth in claim 10 and wherein:

the data receiving means includes a first data receiving means and a second data receiving means;

the I/O communications further include a plurality of I/O subsystem data return communications including a first data return communication which specifies that data be returned to the first data receiving means and a second data return communication which specifies that data be returned to the second data receiving means; and when the I/O subsystem component receives a first data return communication intended for the I/O subsystem component, the first data receiving means receives the data and when the I/O subsystem component receives a second data return communication intended for the I/O subsystem component, the second data receiving means receives the data.

12. The interface apparatus set forth in claim 10 wherein:

the I/O communications further include a system component message communication having a type and specifying an operation in which a message is transferred from the I/O subsystem component to a non-memory system component;

the third plurality of lines further carries a control word during a first I/O subsystem bus cycle and a message during a second I/O subsystem bus cycle of the system component message communication, the control word identifying the type of system component message communication and identifying the system component to which the message is to be transferred; and the second output means further outputs the control word during the first I/O subsystem bus cycle of the system component message communication.

13. The interface apparatus set forth in claim 10 wherein:

the system components are connected by a system bus which carries system communications including system component message communications and includes a busy line for carrying a busy signal which indicates to a system component which was the source of a system component message communication that the system component message communication cannot presently be sent;

the I/O subsystem bus further includes a system component message not ready line and is coupled to the system bus by means of a system bus interface which converts a system component message communication destined for the I/O subsystem component to a corresponding I/O subsystem message communication and an I/O subsystem message communication destined for a system component to a corresponding system component message communication; and the interface apparatus further includes system component message not ready signal output means connected to the system component message not ready line for outputting a system component message not ready signal when the I/O subsystem component cannot respond to a system component message communication destined for the I/O subsystem component, the system bus interface means responding to the system component message not ready signal and to a system component message communication destined for the I/O subsystem component by not converting the system component message communication to the corresponding I/O subsystem message communication and setting the busy line to indicate that the I/O subsystem system component is busy, whereby the system bus immediately becomes available for any system communication other than a system component message communication destined for the I/O subsystem component.

14. The interface apparatus set forth in claim 13 wherein:

the I/O subsystem system component includes a plurality of I/O subsystem components coupled to the I/O subsystem bus;

an I/O subsystem component of the plurality is further a source of certain I/O subsystem message communications in that the interface means places an I/O command on the first plurality of lines, a target identification for another I/O subsystem component on the second plurality of lines, and a message on the third plurality of lines during a single I/O subsystem bus cycle; and the interface apparatus of an I/O subsystem component of the plurality which is not currently a source of an I/O subsystem message communication remains responsive to an I/O subsystem message communication whose source is not a system component while the system component message not ready line is carrying the system component message not ready signal.

15. An I/O subsystem component interface for interfacing an I/O subsystem component to an I/O subsystem bus in an I/O subsystem system component of a digital data processing system, the I/O subsystem system component including at least one I/O subsystem component and the I/O subsystem bus carrying I/O communications, which require one or more I/O subsystem bus cycles, and which include a first type of the I/O communications which the interfaced I/O subsystem component originates and provides to the I/O subsystem bus but to which the interfaced I/O subsystem component does not respond and a second type of the I/O communications which includes I/O communications originated and provided by the interfaced I/O subsystem component and to which the interfaced I/O subsystem component responds, the I/O communications being carried on the I/O subsystem bus by means of a first plurality of lines for carrying an I/O command specifying one of the I/O communications, a second plurality of lines for carrying a target identification identifying one of the I/O subsystem components, and a third plurality of lines for carrying other information required for the specified I/O communication, the I/O subsystem component interface comprising:

means for interfacing with the I/O subsystem bus when the interfaced I/O subsystem component is providing one of the first type of I/O communications including means coupled to the first plurality of lines for providing the I/O command specifying the one I/O communication to the first plurality of lines during all of the I/O subsystem bus cycles required for the one I/O communication, means coupled to the second plurality of lines for providing the target identification required for the one I/O communication during all of the required I/O subsystem bus cycles, first other communication information providing means coupled to the third plurality of lines for providing a first portion of the other information required for the one I/O communication to the third plurality of lines during the first I/O subsystem bus cycle required for the one I/O communication, and additional other communication information providing means coupled to the third plurality of lines for providing an additional portion of the other information during any remaining I/O subsystem bus cycles required for the one I/O communication; and means for interfacing with the I/O subsystem bus when the interfaced I/O subsystem component is responding to one of the second type of I/O communications including detection means coupled to the second plurality of lines for detecting a target identification identifying the interfaced I/O subsystem component during transfer of the one of the second type of I/O communications, I/O command decoding means coupled to the first plurality of lines for decoding an I/O command received on the first plurality of lines during transfer of the one of the second type of I/O communications, and other information receiving means coupled to the third plurality of lines for receiving the other I/O information on the third plurality of lines during transfer of the one of the second type of I/O communications.

16. The I/O subsystem component interface as set forth in claim 15 and wherein:

the second type of I/O communications includes a first I/O communication specifying an operation in which the interfaced I/O subsystem component receives a message included in the first I/O communication for controlling the interfaced I/O subsystem component and a second I/O communication in which the interfaced I/O subsystem component receives data included in the second I/O communication; and the other information receiving means includes message receiving means for receiving the message when a decoded I/O command indicates the first I/O communication and data receiving means for receiving the data when the decoded I/O command indicates the second I/O communication.

17. The I/O subsystem component interface as set forth in claim 15 and wherein:

the other information receiving means includes first data receiving means for receiving a word of data and second data receiving means for receiving a word of data;

the second type of I/O communications include a first data return communication specifying an operation which provides a word of data which is included in the first data return communication to the first data receiving means and a second data return communication specifying an operation which provides a word of data which is included in the second data return communication to the second data receiving means; and the first data receiving means responds to the I/O command decoding means to receive the data word when a decoded I/O command indicates the first data return communication and the second data receiving means responds to the I/O command decoding means to receive the data word when the decoded I/O command indicates the second data return communication.

18. The I/O subsystem component interface as set forth in claim 15 and wherein:

the first type of I/O communications include a first I/O communication which requires two I/O subsystem bus cycles and which transfers a first data word and a second I/O communication which requires three I/O subsystem bus cycles and which transfers a first data word and a second data word;

the additional other communication information providing means includes a first data output means which outputs the first data word for both first and second I/O communications and a second data output means which outputs the second data word for the second I/O communication; and the first data output means outputs the first data word for both first and second I/O communications to the third plurality of lines during the second I/O subsystem bus cycle and the second data output outputs the second data word for the second I/O communication to the third plurality of lines during the third I/O subsystem bus cycle.

19. An I/O subsystem component used in an I/O subsystem for coupling a peripheral device to a synchronous I/O subsystem bus, the I/O subsystem including at least one I/O subsystem component and being a system component of a digital data processing system which includes other system components (at least one of which is a memory means) which are coupled indirectly to the I/O subsystem bus and the I/O subsystem bus carrying a plurality of I/O communications which require one or more I/O subsystem bus cycles and including a first plurality of lines for carrying an I/O command specifying one of the I/O communications during all of the I/O subsystem bus cycles required for the specified communication, a second plurality of lines for carrying a target identification identifying an I/O subsystem component involved in the specified communication during all of the I/O subsystem bus cycles required for the specified communication, and a third plurality of lines for carrying information including messages and data as required for the specified communication, the I/O subsystem component comprising:

interface means for coupling to the I/O subsystem bus for providing an I/O communication by providing an I/O command to the first plurality of lines during all I/O subsystem bus cycles required for the I/O communication, providing a target identification to the second plurality of lines during all I/O subsystem bus cycles required for the I/O communication, and providing the information to the third plurality of lines, the information varying from I/O subsystem bus cycle to I/O subsystem bus cycle as required for the I/O communication, and responding to an I/O communication by receiving an I/O command from the first plurality of lines, receiving a target identification from the second plurality of lines, and if the I/O command and the target identification indicates an I/O communication destined for the I/O subsystem component, receiving the information from the third plurality of lines;

device adapter means coupled between the peripheral device and the interface means for providing data to and receiving data from the peripheral device; and control means to the interface means and the device adapter means and responsive to the interface means and to the device adapter means for controlling the I/O subsystem component to originate and respond to the I/O communications, and wherein the I/O communications include and I/O memory write communication which requires at least two I/O subsystem bus cycles and which specifies an operation in which data include in the I/O memory write communication is transferred between the I/O subsystem component and a location in the memory means specified by a memory address included in the I/O memory write communication, the I/O memory write communication being provided in that the control means provides the I/O command specifying the I/O memory write communication, the target identification of the I/O subsystem component, and a memory address to the interface means, the interface means providing the memory address on the third plurality of lines during the first I/O subsystem bus cycle and the data during any remaining I/O subsystem bus cycles, an I/O subsystem message communication which requires a single I/O subsystem bus cycle and specifies an operation in which a message is transferred to a second I/O subsystem component, the I/O subsystem message communication being provided by the I/O subsystem component in that the control means provides the I/O command for the I/O subsystem message communication, the target identification for the second I/O subsystem component, and the message to the interface means and the interface means places the I/O command on the first plurality of lines, the target identification on the second plurality of lines, and the message on the third plurality of lines for the single I/O subsystem bus cycle, and the I/O subsystem message communication being responded to by the second I/O subsystem component in that an interface means of the second I/O subsystem component receives the message on the third plurality of lines and a control means of the second I/O subsystem component interprets the received message and controls the second I/O subsystem component in accordance therewith, and an I/O subsystem data return communication which requires a single I/O subsystem bus cycle and specifies an operation in which data is provided to the I/O subsystem component, the I/O subsystem responding to the I/O subsystem data return communication in that the interface means receives the data on the third plurality of lines.

20. The I/O subsystem component as set forth in claim 19 and wherein the interface means comprises:

first output means coupled to the first plurality of lines and to the control means for receiving the I/O command from the control means and outputting the I/O command to the first plurality of lines;

second output coupled to the second plurality of lines and to the control means for receiving the target identification from the control means and outputting the target identification to the second plurality of lines;

third output means coupled to the control means and to the third plurality of lines for receiving the memory address from the control means and outputting the memory address to the third plurality of lines during the first I/O subsystem bus cycle of the memory write communication;

fourth output means coupled to the control means and the device adapter means and to the third plurality of lines for receiving the data from the device adapter means and the control means and outputting the data to the third plurality of lines during the second I/O subsystem bus cycle of the I/O memory write communication;

target identification receiving means coupled to the second plurality of lines for receiving the target identification and determining whether the received target identification matches an identification of the I/O subsystem component;

I/O command receiving and decoding means coupled to the first plurality of lines for responding to a match detected by the target identification receiving means by receiving and decoding the I/O command on the first plurality of lines;

message receiving means coupled to the third plurality of lines and to the control means and responsive to the I/O command decoding means for receiving the message on the third plurality of lines when the target identification and the I/O command indicate that the I/O communication is an I/O subsystem message communication to which the I/O subsystem component is to respond and providing the message to the control means; and data receiving means coupled to the third plurality of lines, to the control means, and to the device adapter means and responsive to the I/O command decoding means for receiving data on the third plurality of lines when the target identification and the I/O command indicate that the I/O communication is an I/O subsystem data return communication to which the I/O subsystem component is to respond.

21. The I/O subsystem component as set forth in claim 19 and wherein:

the control means includes means for specifying a direct memory access operation; and when the direct memory access operation has been specified and the I/O subsystem component is transferring the I/O memory write communication, the device adapter means provides the data to the interface means and when the direct memory access operation has been specified and the I/O subsystem component is responding to the I/O subsystem data return communication, the device adapter means takes the data from the interface means.

22. The I/O subsystem component as set forth in claim 21 and wherein:
the interface means includes memory address incrementing means and
when the direct memory access operation has been specified, the control means provides a start address for a first one of a sequence of I/O memory write communications and the device adapter means employs the address incrementing means to provide memory addresses for the remaining I/O memory write communications in the sequence.

23. The I/O subsystem component set forth in claim 19 wherein:
the I/O communications further include a system component message communication which requires at least two I/O subsystem bus cycles and which specifies an operation in which a message is transferred between the I/O subsystem component and a non-memory system component, the system component message communication being provided by the I/O subsystem component in that the control means provides the I/O command for the system component message communication, the target identification for the I/O subsystem component, a control word identifying a type of system component message communication and the system component that is the destination of the system component message communication, and a message to the interface means, and the interface means provides the control word during the first I/O subsystem bus cycle and the message for any remaining I/O subsystem bus cycles.

24. The I/O subsystem component as set forth in claim 23 and wherein the interface means comprises:
first output means coupled to the first plurality of lines and to the control means for receiving the I/O command from the control means and outputting the I/O command to the first plurality of lines;
second output means coupled to the second plurality of lines and to the control means for receiving the target identification from the control means and outputting the target identification to the second plurality of lines;
third output means coupled to the control means and to the third plurality of lines for receiving the memory address from the control means and outputting the memory address to the third plurality of lines during the first I/O subsystem bus cycle of the memory write communication, for receiving the control word from the control means and outputting the control word to the third plurality of lines during the first I/O subsystem bus cycle of the system component message communication, and receiving a message from the control means and outputting the message to the third plurality of lines during the single I/O subsystem bus cycle of the I/O subsystem message communication;
fourth output means coupled to the control means and the device adapter means and to the third plurality of lines for outputting the data to the third plurality of lines during the second I/O subsystem bus cycle of the I/O memory write communication;
target identification receiving means coupled to the second plurality of lines for receiving the target identification and determining whether the received target identification matches an identification of the I/O subsystem component;
I/O command receiving and decoding means coupled to the first plurality of lines for responding to a match detected by the target identification receiving means by receiving and decoding the I/O command on the first plurality of lines;
message receiving means coupled to the third plurality of lines and to the control means and responsive to the I/O command decoding means for receiving the message on the third plurality of lines when the target identification and the I/O command indicate that the I/O communication is an I/O subsystem message communication to which the I/O subsystem component is to respond and providing the message to the control means; and
data receiving means coupled to the third plurality of lines, to the control means, and to the device adapter means and responsive to the I/O command decoding means for receiving data on the third plurality of lines when the target identification and the I/O command indicate that the I/O communication is an I/O subsystem data return communication to which the I/O subsystem component is to respond.

* * * * *